United States Patent
Pavek et al.

(10) Patent No.: US 9,983,305 B2
(45) Date of Patent: *May 29, 2018

(54) LOW COST 3D RADAR IMAGING AND 3D ASSOCIATION METHOD FROM LOW COUNT LINEAR ARRAYS FOR ALL WEATHER AUTONOMOUS VEHICLE NAVIGATION

(71) Applicant: RFNav, Inc., Glenelg, MD (US)

(72) Inventors: Richard E. Pavek, Marble Falls, TX (US); Jefferson M. Willey, Glenelg, MD (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/649,879

(22) Filed: Jul. 14, 2017

(65) Prior Publication Data

US 2017/0315229 A1  Nov. 2, 2017

Related U.S. Application Data

(63) Continuation of application No. 15/467,299, filed on Mar. 23, 2017, now Pat. No. 9,739,881.
(Continued)

(51) Int. Cl.
 *G01S 13/86* (2006.01)
 *G01S 13/89* (2006.01)
 *G01S 13/93* (2006.01)

(52) U.S. Cl.
 CPC .............. *G01S 13/89* (2013.01); *G01S 13/86* (2013.01); *G01S 13/865* (2013.01);
 (Continued)

(58) Field of Classification Search
 CPC ...... G01S 13/86; G01S 13/865; G01S 13/867; G01S 13/89; G01S 13/931;
 (Continued)

(56) References Cited

U.S. PATENT DOCUMENTS 5,675,343 A  10/1997  Champeau
6,157,339 A  12/2000  Sato et al.
(Continued)

FOREIGN PATENT DOCUMENTS

WO  2017/165728 A1  9/2017

OTHER PUBLICATIONS

"A Mills Cross Multiplicative Array with the Power Pattern of a Conventional Planar Array," MacPhie, Robert H., 1-4244-0878-4/07, 4pp.
(Continued)

*Primary Examiner* — Timothy A Brainard
(74) *Attorney, Agent, or Firm* — Edell, Shapiro & Finnan, LLC

(57) ABSTRACT

A low cost, all weather, high definition imaging system for an autonomous vehicle is described. The imaging system generates true target object data suitable for imaging, scene understanding, and all weather navigation of the autonomous vehicle. Data from multiple arrays is fed to a processor that performs data association to form true target detections and target positions. A Boolean associator uses an association method for determining true target detections and target positions to reduce many of the ghosts or incorrect detections that can produce image artifacts. The imaging system provides near optimal imaging in any dense scene for autonomous vehicle navigation, including during visually obscured weather conditions such as fog. The system and method can be applied to variety of imaging technologies, including an RF system, a Lidar system, a sonar system, an ultrasound system, and/or an optical system.

20 Claims, 24 Drawing Sheets

Related U.S. Application Data

(60) Provisional application No. 62/341,939, filed on May 26, 2016, provisional application No. 62/314,372, filed on Mar. 28, 2016, provisional application No. 62/312,681, filed on Mar. 24, 2016.

(52) U.S. Cl.
CPC .......... *G01S 13/867* (2013.01); *G01S 13/931* (2013.01); *G01S 2013/935* (2013.01); *G01S 2013/9342* (2013.01); *G01S 2013/9346* (2013.01)

(58) Field of Classification Search
CPC ..... G01S 2013/9342; G01S 2013/9346; G01S 2013/935
USPC .......................................................... 342/54
See application file for complete search history.

(56) References Cited

U.S. PATENT DOCUMENTS

| | | | |
|---|---|---|---|
| 6,288,672 | B1 | 9/2001 | Asano et al. |
| 9,739,881 | B1* | 8/2017 | Pavek .................... G01S 13/89 |
| 2011/0199254 | A1 | 8/2011 | Bishop et al. |
| 2012/0119937 | A1 | 5/2012 | Yamada et al. |
| 2012/0268307 | A1* | 10/2012 | Tomich ................... G01S 13/89 342/22 |
| 2012/0306681 | A1* | 12/2012 | Elad ...................... G01S 13/867 342/27 |
| 2014/0062762 | A1 | 3/2014 | Kurono et al. |
| 2015/0285904 | A1 | 10/2015 | Rao |

OTHER PUBLICATIONS

"An Aperture Distribution Technique for Product-Array Antennas," Kefalas, George P., May 25, 1967 manuscript, 1p.
"Autonomous Vehicle Technologies: Localization and Mapping," Kamijo et al., IEICE Fundamentals Review, vol. 9, No. 2, 11pp.
"Bad Weather and Self-Driving Cars Don't Mix," Motavalli, Jim, Mother Nature Network, Feb. 2, 2015, 5pp.
"Effect of Mutual Coupling on the Performance of Adaptive Arrays," Gupta and Ksienski, IEEE Transaction son Antennas and Propagation, vol. AP-31, No. 5, Sep. 1983, 7pp.
"Electromagnetic Compatibility and Radio spectrum Matters (ERM); Road Transport and Traffic Telematics (RTTT); Short Range Radar to be used in the 24 GHz to 27,5 GHz band; System Reference Document," ETSI TR 102 664 V1.2.1, Apr. 2010, 32 pp.
"An Experimental Study of Antenna Array Calibration," Gupta et al., IEEE Transactions on Antennas and Propagation, vol. 51, No. 3, Mar. 2003, 4pp.
"FM Low-Range Radar—From Systems of Weapon to Precision Distance Meters," Komarov and Smolskiy, SIB Conyers 1999, Moscow Power Engineering Institute, 3pp.
"Hidden Obstacles for Google's Self-Driving Cars," Gomes, Lee, MIT Technology Review, Aug. 28, 2014, 3pp.
"Influences of weather phenomena on automotive laser radar systems," Rasshofer et al., Adv. Radio Sci., vol. 9, 2011, 12pp.
"Linear FMCW radar techniques," Stove, A.G., IEE Proceedings-F, vol. 139, No. 5, Oct. 1992, 8pp.
"Mutual Coupling Compensation in Small Array Antennas," Steyskal and Herd, IEEE Transactions on Antennas and Propagation, vol. 38, No. 12, Dec. 1990, 5pp.
"Navigation Errors Introduced by Ground Vehicle Dynamics," Travis and Bevly, Auburn University, 9pp.
"Optimising the Radiation Pattern of Sparse Periodic Linear Arrays," Lockwood et al., IEEE Transactions on Ultrasonics, Ferroelectrics, and Frequency Control, vol. 43, No. 1, Jan. 1996, 8pp.
"Recent progress in road and lane detection: A survey," Machine Vision and Applications, Apr. 2014, 20pp.
"Simple 3D Localization of Tag-Free Moving Targets by UWB Radar," Kazimir et al., Technical University of Kosice, Letna, 4pp.
"Teaching Machines to See: new smartphone-based system could accelerate development of driverless cars," Collins, S., University of Cambridge Research, Research Horizons, Dec. 21, 2015, 5pp.
"Tracking Vehicles with GPS: Is it a Feasible Solution?," Zheng et al., Department of Civil and Environmental Engineering, University of Washington, 21pp.
"Automated Driving: Levels of Driving Automation Are Defined in New SAE International Standard J3016," Jan. 16, 2014, 2pp.
International Search Report dated May 29, 2017 for International Patent Application No. PCT/US2017/023954.

\* cited by examiner

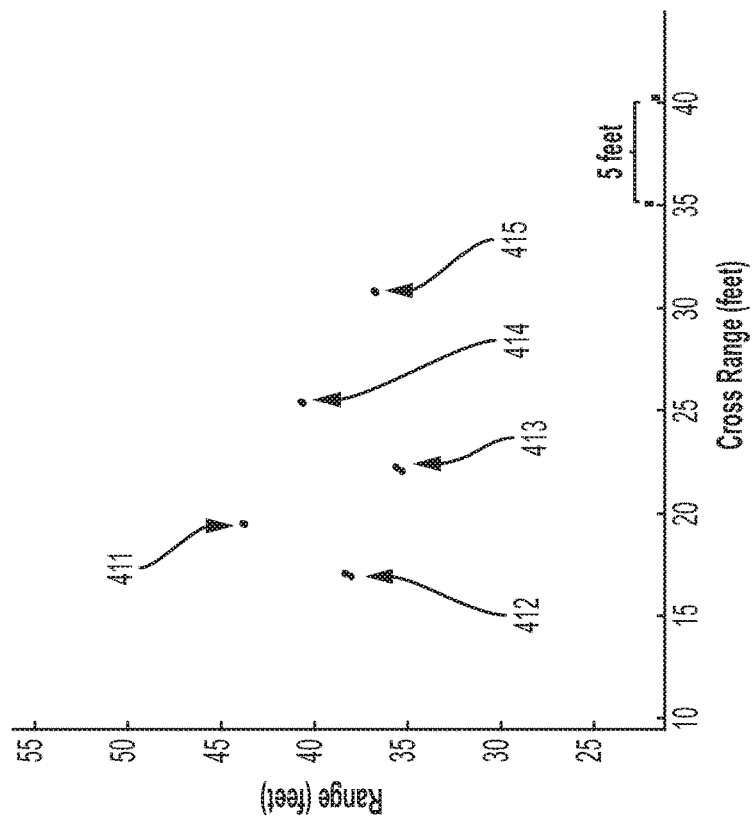
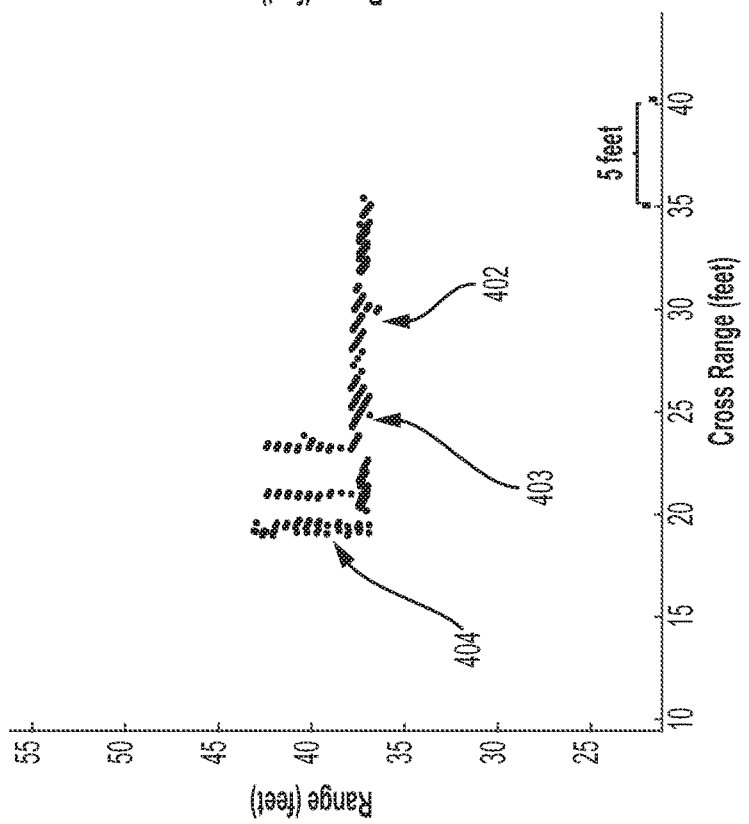
FIG. 5B
FIG. 5A

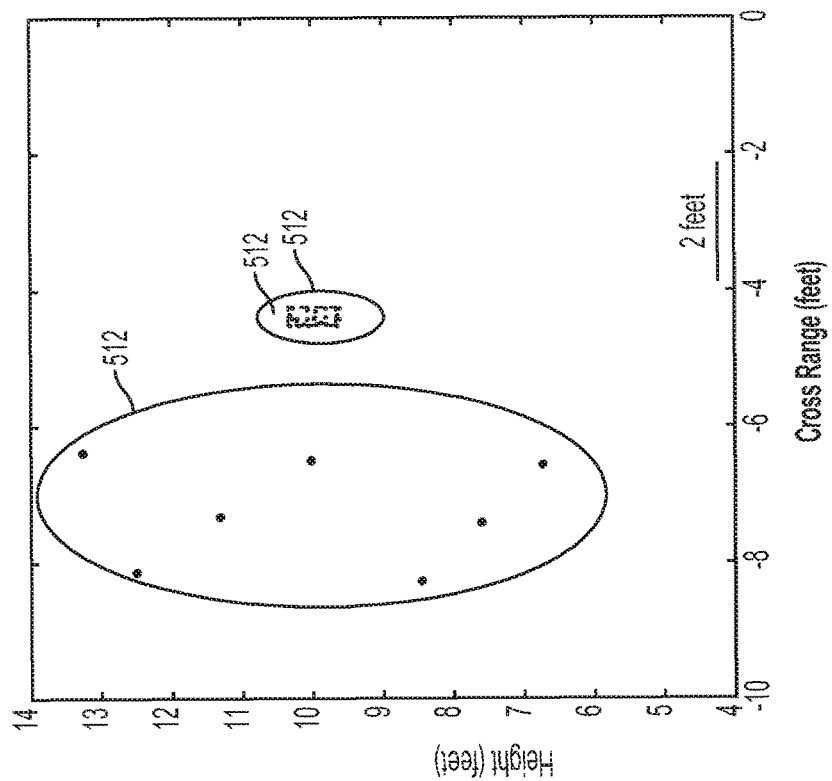
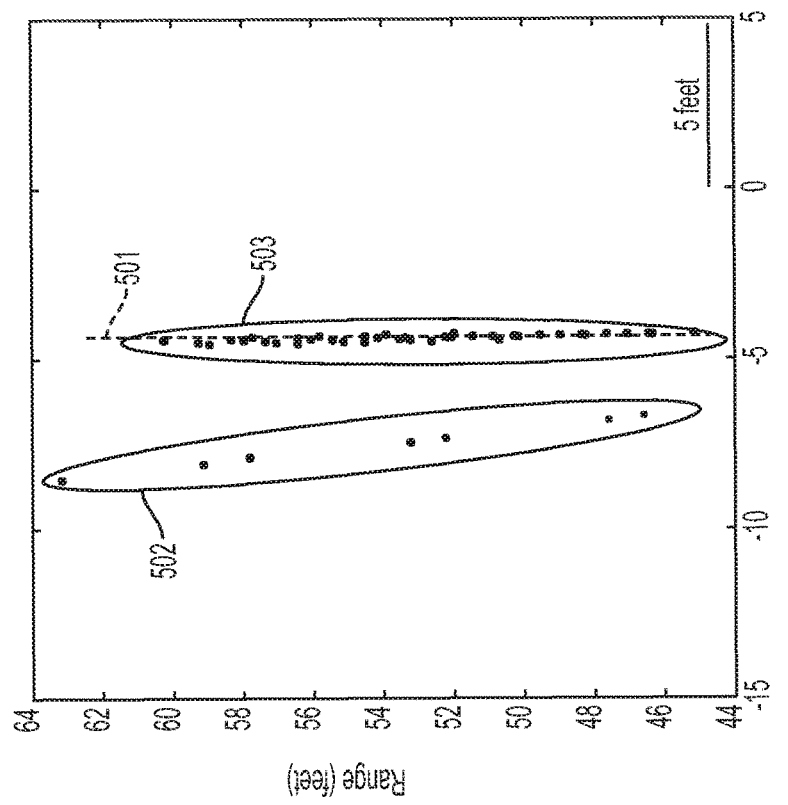
FIG. 6B
FIG. 6A

LOW COST 3D RADAR IMAGING AND 3D ASSOCIATION METHOD FROM LOW COUNT LINEAR ARRAYS FOR ALL WEATHER AUTONOMOUS VEHICLE NAVIGATION

CROSS-REFERENCE TO RELATED APPLICATIONS

This application is a continuation of co-pending U.S. application Ser. No. 15/467,299, entitled "Low Cost 3D Radar Imaging and 3D Association Method From Low Count Linear Arrays for All Weather Autonomous Vehicle Navigation", filed on Mar. 23, 2017, now U.S. Pat. No. 9,739,881, which application claims priority under 35 U.S.C. § 119(e) to the following applications: U.S. Provisional Patent Application Ser. No. 62/312,681, which was filed in the U.S. Patent and Trademark Office on Mar. 24, 2016 and entitled "Ultra Low Cost Imaging Radar Aperture for All Weather Navigation with Self-Driving Cars"; U.S. Provisional Patent Application Ser. No. 62/314,372, which was filed in the U.S. Patent and Trademark Office on Mar. 28, 2016 and entitled "Low Cost 3D Radar Imaging and 3D Association Method from Low Count Linear Arrays for All Weather Navigation with Self-Driving Cars"; and U.S. Provisional Patent Application Ser. No. 62/341,939, which was filed in the U.S. Patent and Trademark Office on May 26, 2016 and entitled "Low Cost Apparatus and Method for Single Look Ghost-free 3D Target Association from Geographically Diverse Sensors", the disclosures of all of which applications are hereby incorporated by reference in their entirety.

BACKGROUND OF THE INVENTION

This application relates to a high-definition radio frequency radar system for an autonomous vehicle. This application also relates to a method of data association for object detection for use in controlling autonomous vehicles.

Autonomous vehicles must provide solutions to three fundamental problems: "Where am I? What is around me? What do I do next?" The first question, also known as localization, requires the autonomous vehicle to determine its location with respect to a known map. Localization ranges from coarse determination of the autonomous vehicle's street address to a more accurate self-position relative to a road's centerline, travel lane boundaries, cross-walks, sidewalks, road signs, and other road features. The second question addresses the question of situational awareness. Situational awareness includes determining which nearby objects such as other vehicles, humans and animals have potential interaction with or potential collision with the autonomous vehicle. The last question is how the autonomous vehicle should navigate in light of answers to localization and situational awareness given a pre-planned destination.

Localization typically starts with coarse position estimates from GPS/INS systems. Position accuracy is improved by simultaneous localization and mapping (SLAM) from road and other features obtained from optical sensors such as cameras and Lidar. The 1D, 2D, and 3D optical sensors derive localization cues from paint marks, travel lanes, road signs, curb edges, lamp posts, building boundaries, etc., cross-correlated against pre-stored maps. The state-of-the art integrates GPS/INS, 3D optical data from Lidar, and camera derived road features with a Kalman tracking filter to improve localization accuracy and reduce position variance.

Situational awareness requires position and velocity estimation of objects, including other vehicles and people, in the vicinity of autonomous vehicle's planned path. Conventional approaches for velocity estimation are obtained by coarse angle resolution radar and by multiple observations of a slowly moving object obtained from stereoscopic cameras, Lidars, and/or ultrasonic sensors.

The state-of-the-art localization and lane keeping functions fundamentally rely on road attributes and other features obtained from optical sensors. Optical sensors are compromised and can become useless in foul weather and other adverse conditions. The loss of optical sensor data results in autonomous vehicle systems that are unable to navigate safely in the presence of foul weather and other adverse conditions.

Generally, there are two classes of adverse conditions that plague optical sensors: air-borne and surface visual obscurants. Visual air-borne obscurants include: snow and rain precipitation, fog, smoke, smog, pollen, dust, and/or other air-borne obscurants. Further, even when the air path is visually clear, localization can be compromised when only surface visual obscurants are present, including: wet or flooded road surfaces, road and ground covers that include accumulated snow, sand, dust, leaf, pollen, and/or other surface obscurants.

Another problem with the state-of-the-art autonomous vehicle localization occurs under GPS compromised conditions combined with foul weather and/or other adverse conditions. Practical low cost GPS/INS systems incorporating 3D accelerometers and wheel encoders are able to coast only through brief GPS outages before requiring GPS to reset accumulated biases. Urban canyons, with their long GPS shadows and multipath opportunities, result in mean and variance position errors frequently exceeding 10 feet or more. One approach to overcome the GPS outages is to integrate GPS/INS state information with apriori 3D visual maps and passive optical sensors such as cameras and Lidar to maintain localization.

Unfortunately the latter approach for recovery of self-position in the presence of GPS multipath and outages is viable only under benign weather conditions. The presence of visual air-borne and/or surface obscurants increases the position errors derived from passive and active optical sensors such as cameras and Lidar.

Accordingly, accurate position information for an autonomous vehicle is needed under foul weather and other adverse conditions to navigate with or without GPS. There is a need in the art for a high-definition radar system and method for an autonomous vehicle that addresses the shortcomings of the prior art discussed above.

SUMMARY OF THE INVENTION

In one aspect, the invention provides a high definition RF radar system for an autonomous vehicle. The high definition RF radar system includes a first array and a second array. The first array can include a first plurality of receive antenna elements provided by a first receive switch network and a first plurality of transmit antenna elements provided by a first transmit switch network. The second array can include a second plurality of receive antenna elements provided by a second receive switch network and a second plurality of transmit antenna elements provided by a second transmit switch network. The high definition RF radar system also includes a Boolean associator configured to receive data from the first array and the second array. The Boolean associator can determine that the received data represents a true target detection and target position of an object when a plurality of constraints is met. The plurality of constraints includes at least one first type of constraint and at least one second type of constraint. The high definition RF radar system also can include a scene imaging unit. The scene imaging unit is configured to receive a plurality of true target detections and target positions from the Boolean associator and provide at least one of object detection information and scene imaging information to one or more systems of the autonomous vehicle. The first array can be disposed on the autonomous vehicle with a first orientation such that the first plurality of receive antenna elements and the first plurality of transmit antenna elements are configured for detection in a first direction. The second array can be disposed on the autonomous vehicle with a second orientation such that the second plurality of receive antenna elements and the second plurality of transmit antenna elements are configured for detection in a second direction. The first array is oriented generally orthogonal to the second array.

In another aspect, the invention provides a method of providing scene imaging for an autonomous vehicle using a high definition RF radar system. The method includes transmitting a first RF beam from a first array, the first array comprising a first plurality of transmit antenna elements provided by a first transmit switch network. The method also includes receiving data at the first array received from reflections of the first RF beam, the data being received by a first plurality of receive antenna elements provided by a first receive switch network. The method further includes transmitting a second RF beam from a second array, wherein the second array is oriented generally orthogonal to the first array, the second array comprising a second plurality of transmit antenna elements provided by a second transmit switch network. The method also includes receiving data at the second array received from reflections of the second RF beam, the data being received by a second plurality of receive antenna elements provided by a second receive switch network. The method further includes associating the data from the first array and the second array using a Boolean associator applying a Boolean association method to the data. The Boolean association method determines the data represents a true target detection and target position of an object when a plurality of constraints is met. The plurality of constraints can include at least one first type of constraint and at least one second type of constraint. The method also includes providing at least one of object detection information and scene imaging information to one or more systems of the autonomous vehicle from a scene imaging unit. The scene imaging unit receiving a plurality of true target detections and target positions from the Boolean associator and combining the plurality of true target detections and target positions to form the at least one of object detection information and scene imaging information.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 5A is a representative graphical view of an exemplary embodiment of object detection and scene imaging of a target vehicle using the exemplary embodiment of a high-definition RF radar system;

FIG. 5B is a representative graphical view of object detection and scene imaging of the same target vehicle of FIG. 5A using a conventional radar system;

FIG. 6A is a representative graphical comparison of scene imaging of an 18 foot wall of range and cross-range accuracies of the exemplary embodiment of a high-definition RF radar system and a conventional radar system;

FIG. 6B is a representative graphical comparison of scene imaging of the same wall of FIG. 6A of height and cross-range accuracies of the exemplary embodiment of a high-definition RF radar system and a conventional radar system;

DETAILED DESCRIPTION

Figure 1:
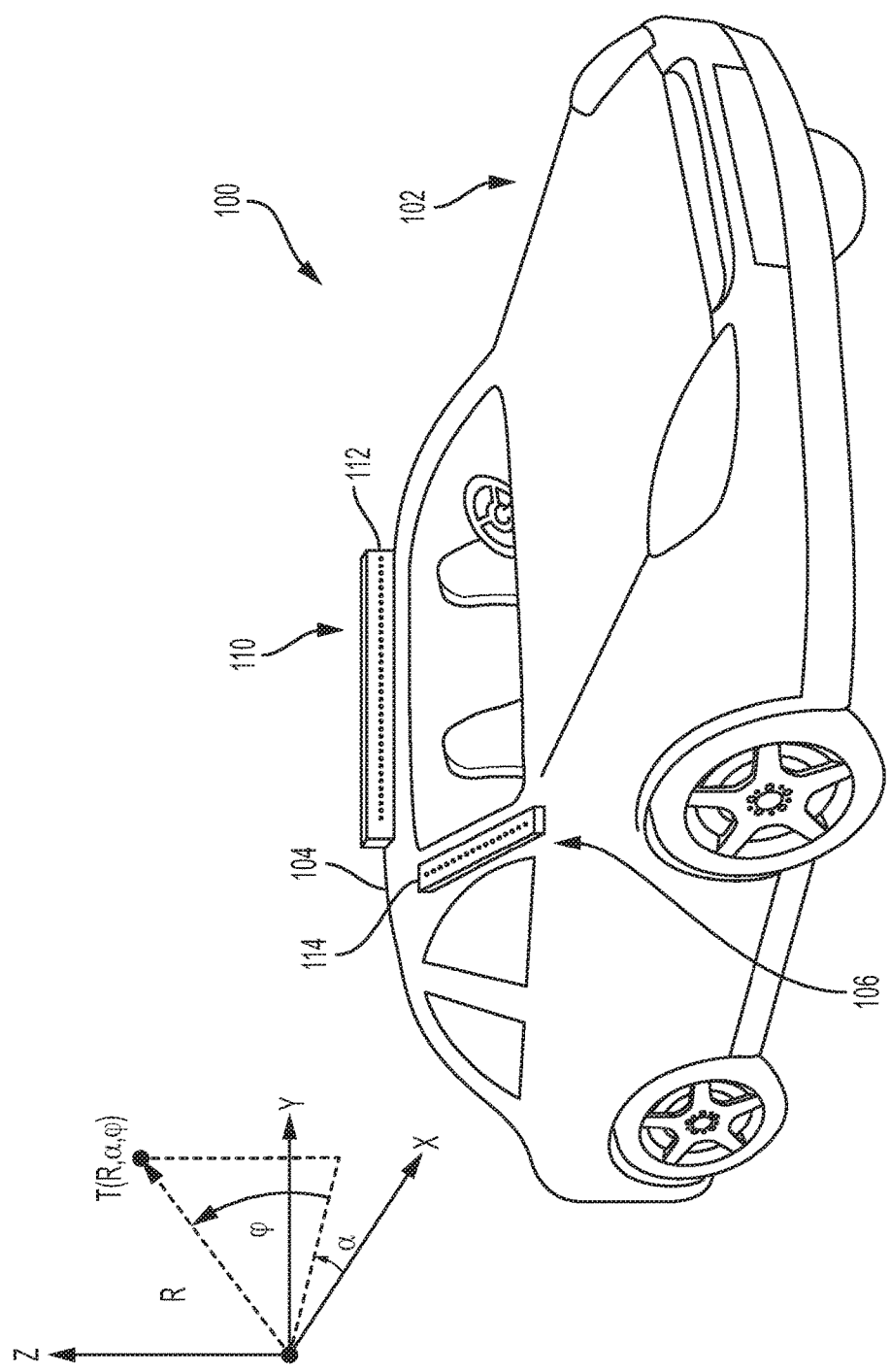
FIG. 1 is a representative view of an autonomous vehicle including an exemplary embodiment of a high-definition RF radar system.

A high-definition radio-frequency (RF) domain imaging sensor for use by autonomous vehicles is disclosed in the exemplary embodiments. In an exemplary embodiment, the high-definition RF domain imaging sensor can be a 4D (3D and Doppler velocity) high definition RF radar system that detects objects to image and/or interpret a scene in both visually clear and opaque weather, as well as when road surface and other features are obscured by precipitation or other adverse conditions. Real time filtered data obtained from the RF radar system also provides sufficient resolution for both localization and navigation of an autonomous vehicle in dense urban environments when GPS is unavailable or compromised. In some embodiments, the high-definition RF radar system's outputs can be further integrated with other traditional autonomous vehicle sensors, including, but not limited to: GPS/INS, cameras, Lidar, ultrasound, wheel encoders, and/or other known conventional vehicle sensors, to permit safe driving in foul weather and improve safe driving in benign weather conditions.

The present embodiments are described with reference to an autonomous vehicle in the form of an autonomous self-driving car (ASDC). The embodiments described herein and the associated principles and methods can be applied to any level of vehicle automation, including, but not limited to any one or more of fully autonomous (Level 5), highly autonomous (Level 4), conditionally autonomous (Level 3), and/or partially autonomous (Level 2), as described in SAE International Standard J3016: Taxonomy and Definitions for Terms Related to On-Road Motor Vehicle Automated Driving Systems, which is incorporated by reference in its entirety. The present embodiments can also be implemented in conventional vehicles to provide additional situational awareness information to a driver, including, but not limited to driver assistance (Level 1), and/or no automation (Level 0), as described in SAE J3016, referenced above.

Moreover, while the exemplary embodiments are described with reference to an automotive vehicle, the embodiments described herein and the associated principles and methods can be applied to any type of autonomous vehicles, including but not limited to: automobiles; trucks; fleet vehicles; heavy construction, mining, or earth moving vehicles; trains; off-road vehicles; factory or warehouse vehicles; as well as any other types of wheeled or tracked land vehicles. The present embodiments can also be applied to autonomous vehicles in other environments, including air and/or sea vehicles, including, but not limited to: UAVs or drones; gliders; airplanes; dirigibles, blimps, and/or zeppelins; other propelled or non-propelled flying or air vehicles; boats; ships; personal watercraft; hovercraft; submersible vessels; and other vehicles traveling in, on, and/or under water. The present embodiments can also be applied to toy vehicles, radio controlled vehicles, amusement rides, and/or other land, air, or sea vehicles regardless of size.

An autonomous vehicle 100 including an exemplary embodiment of a high-definition RF radar system 110 is illustrated in FIG. 1. In this embodiment, autonomous vehicle 100 is a car having a body 102, including at least a roof 104 and support pillars 106 on either side of a windshield. In different embodiments, high-definition RF radar system 110 can be mounted in various locations on autonomous vehicle 100 to provide scene imaging and object detection. In the embodiment shown in FIG. 1, high-definition RF radar system 110 is mounted on autonomous vehicle 100 at locations directed towards detecting objects and scene imaging the front of autonomous vehicle 100. High-definition RF radar system 110 can comprise a pair of arrays, including a first linear array 112 and a second linear array 114. In this embodiment, first linear array 112 is disposed in a generally horizontal orientation on roof 104 of autonomous vehicle 100 and second linear array 114 is disposed in a generally vertical orientation on support pillar 106 of autonomous vehicle 100. In FIG. 1, second linear array 114 is disposed on an A-pillar of autonomous vehicle 100, which may be slanted or angled from the horizontal, but has an overall generally vertical orientation.

It should be understood, however, that high-definition RF radar system 110 can be arranged at different locations on an autonomous subject vehicle to allow detection in any desired direction or orientation. Generally, the locations of arrays on the subject vehicle are chosen to minimize the effect of subject-vehicle structural scattering, air drag, vibration, and airborne particulate accumulation on the array's radome, and/or to maximize the array's field of view. For example, in different embodiments, first linear array 112 and second linear array 114 may instead be mounted on or in the windshield itself, one near the top edge, and another near the side edge. Alternatively, first linear array 112 and second linear array 114 may be similarly mounted on or around the rear or side windows for other embodiments detecting objects behind and/or to the side of the subject vehicle.

In addition, in the exemplary embodiments, a pair of linear arrays is described. It should be understood, however, that the arrays may be arranged into any suitable configurations and need not be strictly linear. For example, the arrays may have different shapes to accommodate placement on a subject autonomous vehicle, including, but not limited to curved shapes, arced shapes, shapes conforming to vehicle surfaces and/or components, as well as various random or organized geometric or non-geometric sparse 2D arrangements for the arrays.

In an exemplary embodiment, the pair of linear arrays, first linear array 112 and second linear array 114, are configured so that the RF beams of each array are generally orthogonal to each other. For example, first linear array 112 is oriented to have azimuthal beams and second linear array 114 is oriented to have elevation beams. In this embodiment, the azimuthal beam from first linear array 112 is generally orthogonal to the elevation beam from second linear array 114. The relationship between Cartesian coordinates (i.e., x-axis, y-axis, z-axis) and the coordinate system of the high-definition RF radar system 110, including first linear array 112 and second linear array 114, that uses range, azimuth, and elevation to determine location of a target T, is shown in FIG. 1.

Further, it should be noted that first linear array 112 is disposed in a generally horizontal orientation on roof 104 of autonomous vehicle 100 and is configured to transmit and receive in a generally azimuthal direction. Similarly, second linear array 114 is disposed in a generally vertical orientation on support pillar 106 of autonomous vehicle 100 and is configured to transmit and receive in a generally elevational direction. In this embodiment, the location and orientation of the pair of linear arrays is configured for forward-facing object detection and/or scene imaging. In other embodiments, different locations and orientations may be chosen based on one or more factors including, but not limited to object detection, scene imaging, type of autonomous vehicle, vehicle environment, and/or other relevant considerations to provide a desired configuration.

Figure 2:
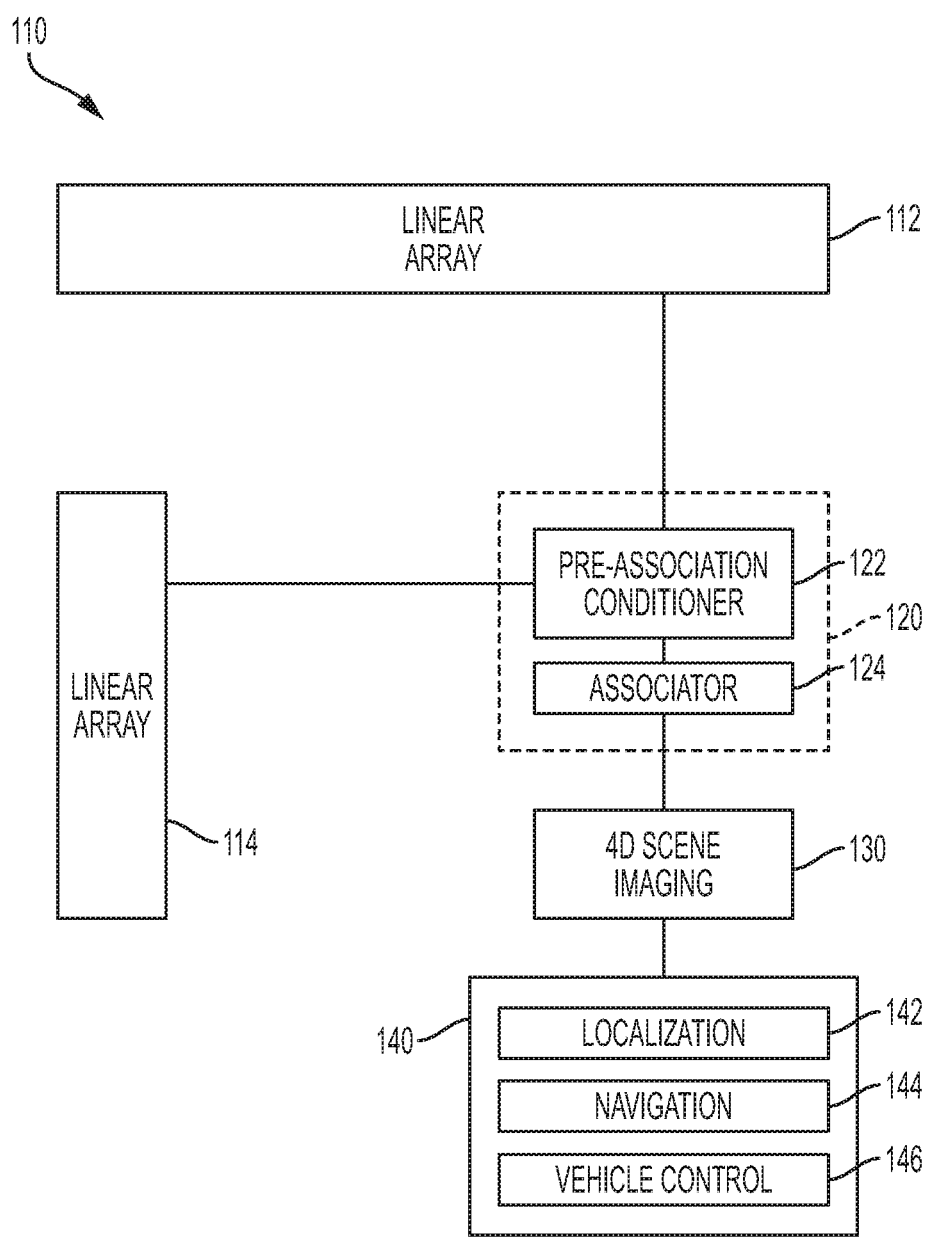
FIG. 2 is a schematic view of the exemplary embodiment of a high-definition RF radar system in an autonomous vehicle.

Referring now to FIG. 2, a schematic illustration of high-definition RF radar system 110 for autonomous vehicle 100 is shown. In an exemplary embodiment, high-definition RF radar system 110 further comprises a coordinated radar processor 120 and a 4D scene imaging unit 130. Coordinated radar processor 120 receives data inputs from first linear array 112 and second linear array 114. In an exemplary embodiment, coordinated radar processor 120 comprises a pre-association conditioner 122 that initially handles the data inputs from first linear array 112 and second linear array 114 and an associator 124 that determines whether the conditioned data indicates a true target detection or a ghost (i.e., a false detection), as will be discussed in more detail below. Data from the pair of linear arrays, including first linear array 112 and second linear array 114, that is determined to represent true targets is passed from coordinated radar processor 120 to 4D scene imaging unit 130. At 4D scene imaging unit 130, the true target data is compiled together to form a scene or object determination that can then be provided to an autonomous vehicle control unit 140.

In some embodiments, outputs from 4D scene imaging unit 130 can be used by various subsystems of autonomous vehicle control unit 140, including, but not limited to a localization unit 142, a navigation unit 144, and/or a vehicle dynamics control unit 146, to control autonomous vehicle 100. For example, vehicle dynamics control unit 146 may be configured to operate one or more of steering, braking, acceleration, safety systems, obstacle avoidance, and/or lane-level guidance operations for the autonomous vehicle. It should be understood that the various subsystems of autonomous vehicle control unit 140 may be optional or different depending on the level of automation of the vehicle. Additionally, in the case of Level 1 or Level 0 automation, autonomous vehicle control unit 140 may be omitted and outputs from 4D scene imaging unit 130 can be shown on a display or transformed into an auditory signal used by a driver to manually control his or her vehicle.

The high-definition RF radar system of the present embodiments exploits a longer wavelength than the shorter optical wavelength sensors which are blind to airborne obscurants. The high-definition RF radar system 110, comprising a pair of linear arrays 112, 114, actively illuminates a scene to penetrate fog, snow, rain, dust, smoke, smog, pollen, and/or other visual obscurants. Radio-frequency wavelengths are able to "see" much further in these adverse conditions compared to the shorter optical wavelengths. The received RF signal reflections from the scene are filtered by coordinated radar processor 120 to extract 3D position and velocity. The 4D scene imaging unit 130 builds a synthetic 3D image of the environment and includes velocity information for detected objects. Internally, the data associated from the pair of linear arrays includes high-definition 4D information comprised of the 3D target position and velocity of each target detection. The target velocities, and their derivatives, contribute to tracking functions for estimating non-stationary object trajectories to improve situational awareness of the autonomous vehicle.

Figure 3:
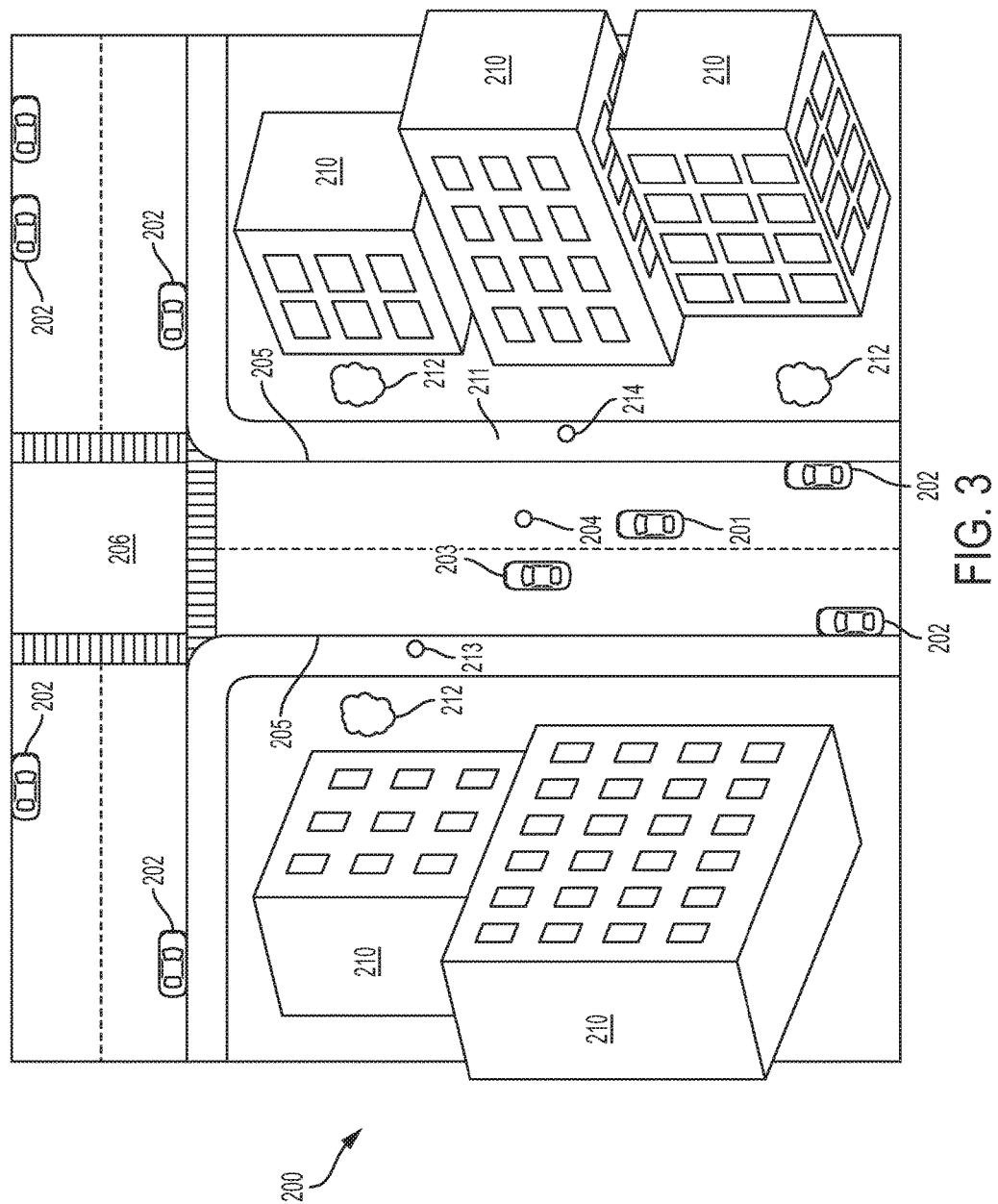
FIG. 3 is a representative plan view of a ground truth of an urban environment for an autonomous vehicle under adverse conditions.
Figure 4:
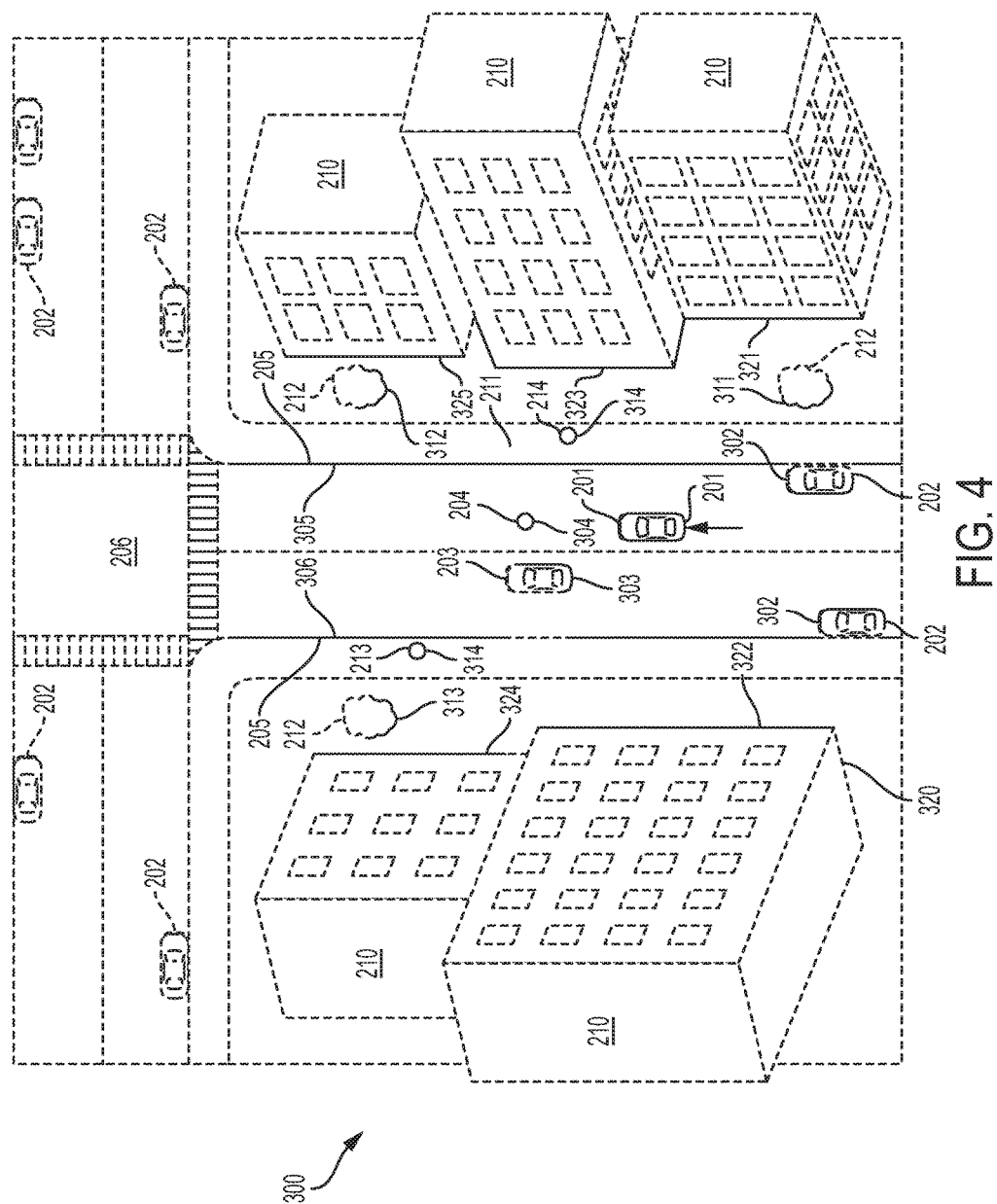
FIG. 4 is a representative plan view of a detected scene imaging of an autonomous vehicle using the exemplary embodiment of a high-definition RF radar system in the urban environment of FIG. 3.

Representation views of operating an autonomous vehicle 201 equipped with high definition RF radar system 110 in adverse weather conditions are shown from a bird's eye view in FIGS. 3 and 4. In the following example, the adverse weather condition is fog, which typically causes problems for conventional optical and/or imaging sensors used on autonomous vehicles. Referring now to FIG. 3, a visual ground truth 200, minus the fog, of an exemplary urban environment for an automobile is shown from a bird's eye view. In this embodiment, visual ground truth 200 includes a single autonomous vehicle 201 equipped with high definition RF radar system 110 traveling on a two-lane road heading towards an intersection 206 with a cross-street. Visual ground truth 200 also includes a plurality of other objects, including, but not limited to: multiple parked or stationary vehicles 202 located along sides of the road and/or cross-street, a moving vehicle 203 heading in a direction towards autonomous vehicle 201, a human 204 crossing the road, curb edges 205 along both sides of the road, buildings 210, sidewalk 211, trees 212, and object 213 and object 214 disposed on sidewalk 211.

High definition RF radar system 110 of the present embodiments can penetrate visual obscurants that typically render optical sensors ineffective to allow autonomous vehicle 100 to "see" visual ground truth 200 in adverse weather conditions, for example, fog described above. Referring now to FIG. 4, a high-definition RF detection scene 300 is provided by 4D scene imaging unit 130 of high definition RF radar system 110 on autonomous vehicle 201. 4D scene imaging unit 130 builds a synthetic 3D image of the urban environment under the foggy conditions and includes velocity information for each of the detected objects. High definition RF radar system 110 filters the 3D image data to detect and locate vertical edges in the scene and provide high-definition RF detection scene 300.

FIG. 4 shows the filtered target detections, indicated by solid lines overlaid onto visual ground truth 200 (shown in outline). In this embodiment, edges 302 of parked or stationary vehicles 202, edges 303 of moving vehicle 203, outline 304 of human 204 crossing the road, and right edge 305 and left edge 306 of curb edges 205 along both sides of the road are all successfully detected, located, and imaged by high definition RF radar system 110. In addition to the objects disposed on or in the road being travelled by autonomous vehicle 201, high-definition RF detection scene 300 further includes objects that are located next to, or along sides of, the road being travelled on by autonomous vehicle 201. For example, outlines 311, 312, and 313 of trees 212 disposed on either sides of the road, outlines 314 of object 213 and/or object 214, which may be stationary objects disposed on sidewalk 211 (such as parking meters or mailboxes) or moving objects traveling along sidewalk 211 (such as humans or animals), are also successfully detected, located, and imaged by high definition RF radar system 110.

Additionally, high-definition RF detection scene 300 can also include information of the location and orientation of facades of buildings 210 disposed on either side of the road being travelled by autonomous vehicle 201. For example, as shown in FIG. 4, a first building edge 320 of building 210 disposed to the left and generally perpendicular to the direction of travel of autonomous vehicle 201, as well as a second building edge 322, a third building edge 324 disposed to the left and generally parallel to the direction of travel of autonomous vehicle 201, and a fourth building edge 321, a fifth building edge 323, and a sixth building edge 325 disposed to the right and generally parallel to the direction of travel of autonomous vehicle 201 are successfully detected, located, and imaged by high definition RF radar system 110. With this arrangement, high definition RF radar system 110 provides a high-definition RF detection scene 300 of relevant portions of visual ground truth 200 in adverse weather conditions, so that autonomous vehicle 201 can safely travel through the urban environment despite poor visibility conditions.

For a high-definition RF radar system to guide an autonomous vehicle, there are unique challenges that must be overcome to realize a practical and low-cost design. First, consider the general need for localization accuracy and precision in an RF imaging sensor under opaque weather conditions, e.g. a fog or heavy snowfall which preclude optical sensors.

Spatial resolution localization requirements for the ego-car or subject vehicle are considered for an urban street scenario with a 10 foot wide travel lane, and a 7 foot wide ego-vehicle and 6" high curbs. A cross-street localization accuracy of less than 1 foot would merely provide a 0.5 foot margin. In the range axis, along the street, a 0.5 foot range accuracy requirement suggests that the subject vehicle maintain a margin of at least 1 foot to the nearest intersection or pedestrian crossing. Next consider some observations of traffic in the opposing lane and curb objects. A double yellow line is about 1 foot wide. Detecting that an opposing vehicle has moved 1 foot on the cross-street axis at 250 feet would require an azimuth resolution of 4 milliradians. Similarly, detecting a change of 6" in height associated with a curb at 63 feet would require 8 milliradians of elevation resolution.

Next consider the RF imaging sensor's bandwidth, carrier frequency, and aperture cross-section area. Since B=c/2 dR, where B is the bandwidth, c is the speed of light, and dR is the range resolution, then a 6" range resolution implies a minimum bandwidth of 1 GHz. With a 6" range resolution, a human separated by 1 foot in range from a stationary non-subject vehicle would be detectable. The 1 GHz bandwidth can be obtained at high frequency where the bandwidth is a small percentage of the carrier. While both the 24+ GHz and 77+ GHz bands are available for automotive RF imaging sensor use, the shorter wavelength associated with the 77 GHz band is preferable for several reasons: one, lower cost associated with commercial mmW transmitter and receiver MIMICs available at 77 GHz; two, the smaller wavelength requires smaller aperture cross-section area for the same beamwidth; three, a 3× increase in Doppler sensitivity at 77 GHz; and four, higher ERP allowed at 77 GHz.

High azimuth resolution is required to support an autonomous vehicle traveling with high probability of no collisions. On a narrow street with two-way traffic, accurate location of a non-subject vehicle is required. FIGS. 5A and 5B illustrate a representative simulation comparing a conventional radar system to high definition RF radar system 110 with a 4 milliradian azimuthal resolution and 6 inch range resolution performed when the non-subject vehicle is at a 50 foot range. In these representations, the non-subject vehicle is oriented so that the right side and rear of the non-subject vehicle is in the high definition RF radar system's field of view on the subject vehicle, for example, autonomous vehicle 100.

FIG. 5A shows the filtered target detections from high definition RF radar system 110 with the non-subject vehicle rear 404, right side contour 403, and side view mirror 402 clearly discernable from the target detections by high definition RF radar system 110. In contrast, FIG. 5B shows target detections obtained from a conventional non-imaging radar system with 280 milliradian azimuthal beamwidth and 1 meter range resolution. As can be seen in FIG. 5B, target detections 411, 412, 413, 414, and 415 obtained from the conventional non-imaging radar system make it difficult to discern the non-subject vehicle boundaries and location with the precision needed for safe driving. Accordingly, with the high definition RF radar system 110 of the present embodiments, accuracy and precision of non-subject vehicle detections is much improved.

FIGS. 6A and 6B are representative graphs of wall estimation precision and accuracy localization capability of high definition RF radar system 110 compared with the conventional radar system. FIG. 6A illustrates the range versus cross-range graph where the wall ground truth 501 is covered by target detections by high definition RF radar system 110, shown as multiple black dots inside region 503, compared to the conventional radar system's target detections, shown inside region 502. FIG. 6B illustrates the height versus cross-range graph where the wall ground truth 511 is densely covered by target detections by high definition RF radar system 110, shown as multiple black dots inside region 513, compared to the conventional radar system's target detections, shown inside region 512. As illustrated by the comparisons in FIGS. 6A and 6B, the conventional radar system has 20× larger range and cross range errors and 4× larger height errors than high definition RF radar system 110 of the present embodiments.

Conventional 2D electronically steered arrays (ESAs) have the capacity to form multiple simultaneous beams on transmission and reception. With simultaneous beams on receive, ESAs have the capacity, on a single look, to form a 3D image comprised of 3D voxels. A voxel is a unit of information representing a single 3D data point. In the present embodiments, voxels represent a 3D detection associated with a unique range, azimuthal angle alpha, and elevation angle phi of the steered received beam. An image can be generated from the detections in a perspective convenient for image processing. In other embodiments, voxels can be represented using units in other coordinate systems, depending on the intended environment for an autonomous vehicle. The conventional 2D ESA has no mechanical parts with improved reliability compared to an alternative mechanically scanned linear 1D array.

A conventional 2D array that supports a 4 milliradian beamwidth in both azimuth and elevation can be both unacceptably large and extremely costly at 77 GHz. A fully populated 2D array would be 3.17 feet by 3.17 feet and have 246,016 (=496$^2$) antenna elements at $\lambda/2$ spacing and their associated transceivers. Both the cost and cross section area of the large array face of greater than 10 square feet is untenable for most automotive applications, as well as many other types of autonomous vehicles.

In the present embodiments, instead of a dense large physical cross-section 2D antenna array, the high definition RF radar is split into two independent generally orthogonal 1D linear arrays. Further, in some embodiments, the linear arrays can be sparsely populated using the convolution principle. The present embodiments further describe a method to synthesize 3D data and velocities from these two generally orthogonal sparse 1D linear arrays to provide object detection and scene imaging for an autonomous vehicle.

Figure 7:
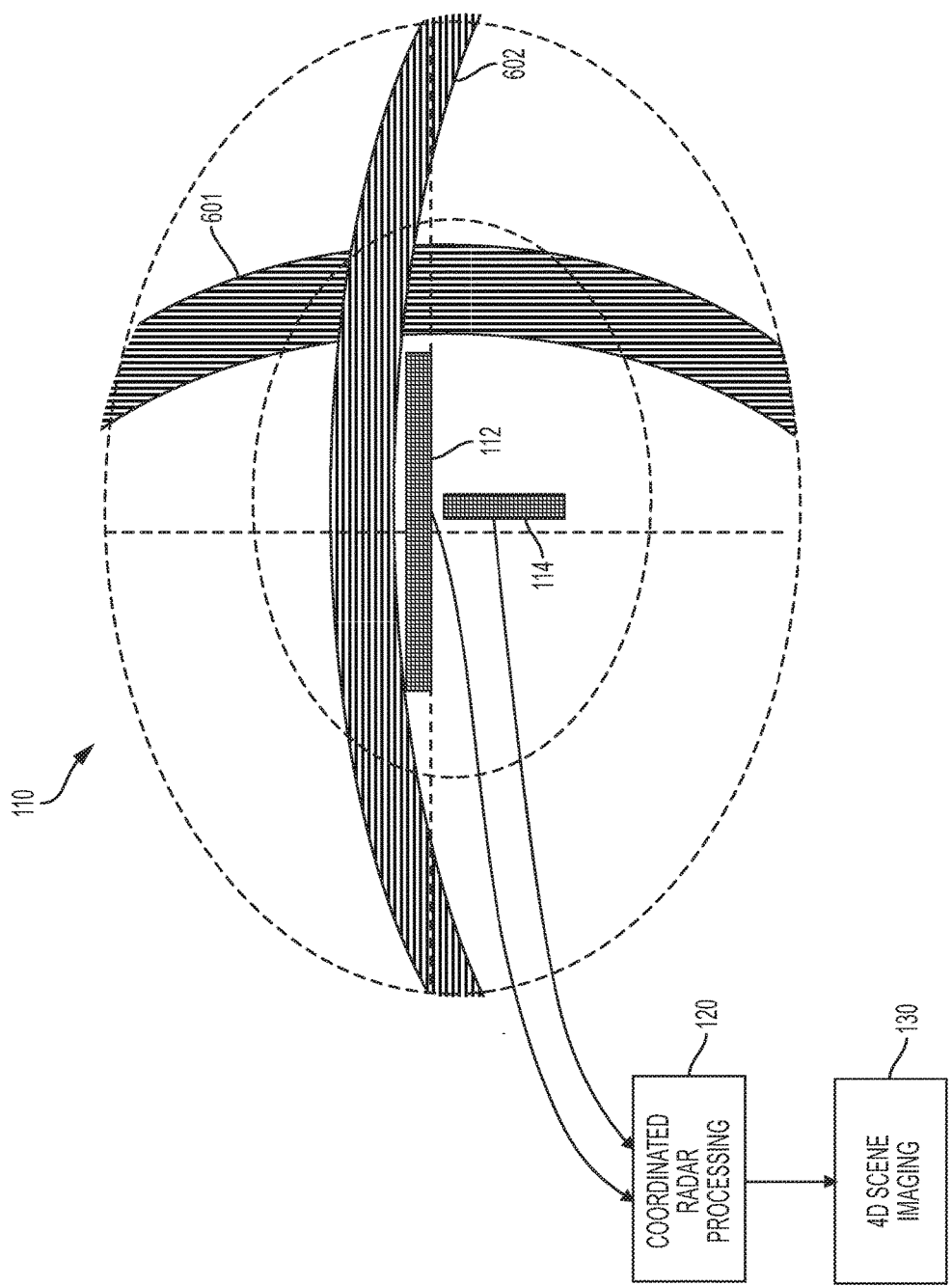
FIG. 7 is a schematic view of the exemplary embodiment of a high-definition RF radar system, including an illustration of a 3D spatial search volume.

The high definition RF radar system of the present application reduces the aperture total area (and associated costs) by more than two orders of magnitude compared to a conventional 2D array. Instead of fully populated 2D array, two generally orthogonally oriented sparse 1D linear arrays are employed. In one embodiment, shown in FIG. 7, first linear array 112 is oriented generally horizontally, and second linear array 114 is oriented generally vertically. First linear array 112 forms azimuthal fan beams 601, while second linear array 114 forms elevational fan beams 602. Each fan beam 601, 602 is comprised of range rings whose depth is the range resolution.

As described above, coordinated radar processor 120 fuses ranges, azimuthal angle, and elevation angle from both first linear array 112 and second linear array 114 to form 3D voxels and extract the 3D velocity vector for each target detection. The acquired data from multiple target detections (i.e., a plurality of 3D voxels and associated velocities) is then used by 4D scene imaging unit 130 to provide object detection and/or scene imaging to a driver and/or autonomous vehicle systems. The association method used by coordinated radar processor 120 to correctly form 3D data from 2D azimuth and elevation data received from first linear array 112 and second linear array 114 is described more fully further below.

Figure 8:
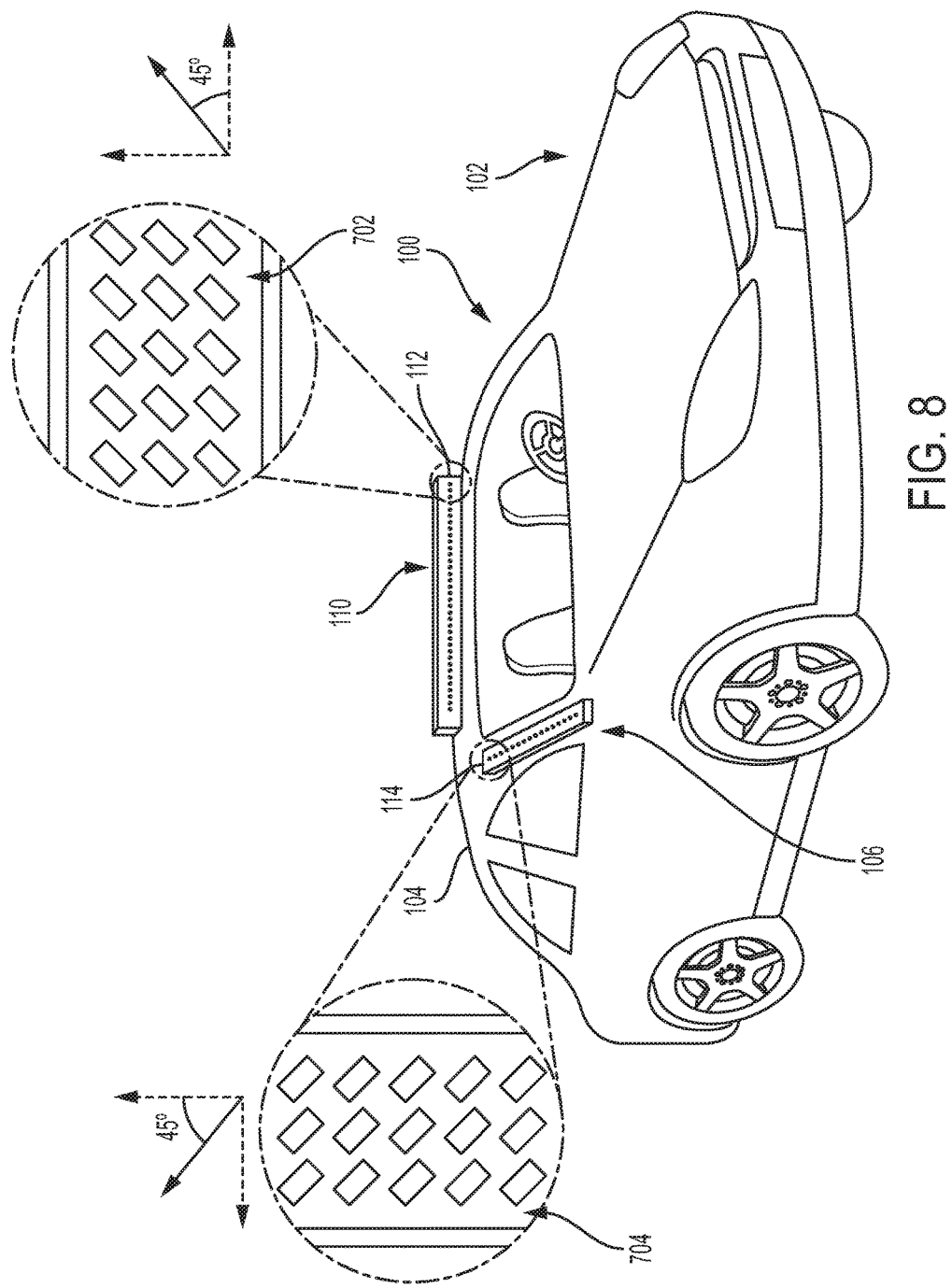
FIG. 8 is a representative view of an autonomous vehicle including an exemplary embodiment of a high-definition RF radar system including slant polarized antenna elements.

FIG. 8 illustrates an alternate embodiment of high-definition RF radar system 110 that includes slant polarized antenna elements. In this embodiment, fan beams from first linear array 112 and second linear array 114 may be spatially tapered by analog summing a small set of micro-strip antenna elements with 45 degree slant polarization. In this embodiment, a first set of micro-strip antenna elements 702 with 45 degree slant polarization is distributed in elevation for first linear array 112 and oriented for azimuth beams. Similarly, a second set of micro-strip antenna elements 704 with 45 degree slant polarization is distributed in azimuth for second linear array 114 and oriented for elevation beams. With this arrangement, the 45 degree slant polarization of first set of antenna elements 702 and/or second set of antenna elements 704 assists with reducing interference caused by signals from other, non-subject vehicles.

One consideration for autonomous vehicle sensors in the automotive environment is the near-field ranges that a high definition RF radar system will see. The near-field is defined as less than $2d^2/\lambda$, where d is the aperture span and $\lambda$ is the RF carrier. At 77.5 GHz with an aperture dimension of 3.17 feet, the near-field ranges are less than 1580 feet. In the very near-field, the received wavefront becomes spherical. Thus spatial beam forming across the radar's arrays is no longer just a function of direction of arrival, but also a function of range.

Both the antenna architecture and 3D data association methods discussed further below are applicable to any radar with a waveform that satisfies the required bandwidth. The waveform could be pulsed or linear-frequency-modulated continuous-wave (LFMCW). In the present embodiments, the transmit radar waveform is assumed to be LFMCW. The matched filter receiver dechirps the linear-frequency modulated signal with a coherent frequency offset copy of the transmit waveform. The resulting intermediate frequency (IF) signal bandwidth is very low and proportional to the range offset of the target plus its maximum radial velocity in Hz. In the automotive environment, with a reasonable sized aperture for the array, the range is almost always near-field with automotive speeds resulting in a very small baseband bandwidth.

FIGS. 9 through 15 describe various architectures for linear arrays that can be used with RF radar systems. Generally, the following discussion of linear arrays will be directed to an array having an aperture that is horizontally oriented with a desired 4 milliradian azimuthal beamwidth. It should be understood that similar architectures can be used to provide a second linear array that is vertically oriented. In the present embodiments, the chirp bandwidth is assumed to be 1 GHz over a 20 micro-second pulse width. At 77.5 GHz, a conventional linear array (CLA) supporting the 4 milliradian beamwidth can be realized with 1 transmit antenna element and 496 receive antenna elements distributed with $\lambda/2$ separation in the 3.17 foot total aperture length. To shape each transmit fan beam in azimuth and elevation an optional lens may be employed.

It should be understood that linear arrays according to the principles described herein can be made with different dimensions and corresponding resolutions. In the present application, the proposed architectures for the RF radar arrays are based on providing similar 5-30 milliradian beamwidths equivalent to Lidar systems conventionally used in automotive systems. However, the sizes of array apertures, numbers of antenna elements, and/or beamwidths can be larger or smaller, with a corresponding increase or decrease in sensor resolution, as desired depending on the type of autonomous vehicle, environment, and/or other considerations for a greater or lesser resolution RF radar system, as would be obvious to one of ordinary skill in the art.

Figure 9:
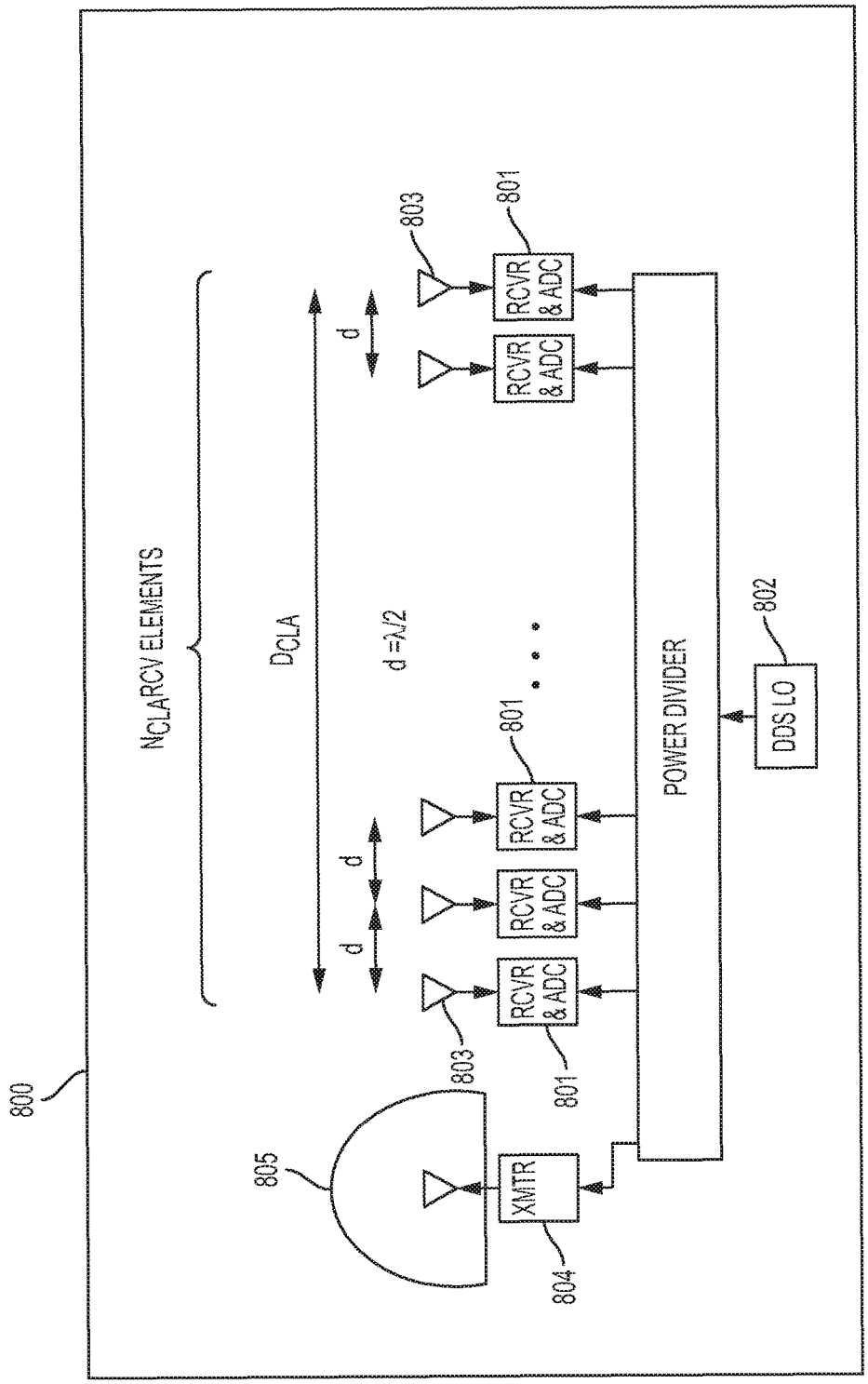
FIG. 9 is a schematic view of an exemplary conventional linear array.

Referring now to FIG. 9, a conventional linear array (CLA) 800 is illustrated. CLA 800 architecture shown in FIG. 9 includes a plurality of dedicated receivers 801 and an analog-to-digital converter (ADC) for each of the plurality of receive antenna elements 803. CLA 800 also includes a single transmitter element 804, with a shared, typically direct digital synthesis, local oscillator (LO) 802 and power divider for transmitter element 804 and plurality of receivers 801. An optional lens 805 may be employed to shape the transmit beam from transmitter element 804. The architecture of CLA 800 requires 496 receivers plus 496 ADCs resulting in prohibitive cost, weight, and power requirements to provide the desired level of resolution discussed above.

To lower the costs of a linear array, the convolution property between two smaller arrays, one transmit and one receive, can be employed.

Let $a_T\left(\frac{x}{\lambda}\right)$ and $a_R\left(\frac{x}{\lambda}\right)$ represent the transmit and receive element weighting as a function of position along each respective array. The two-way response is given by the convolution of the transmit and receive array weighting functions:

$$a_{TOTAL}\left(\frac{x}{\lambda}\right) = \int_{-\infty}^{\infty} a_T\left(\frac{u}{\lambda}\right) a_R\left(\frac{x}{\lambda} - \frac{u}{\lambda}\right) d\left(\frac{u}{\lambda}\right) \quad \text{Equation (1a)}$$

The far-field pattern as function of (relative to boresight) is:

$$a_{TOTAL}(\sin\theta) = \int_{-\infty}^{\infty} a_{TOTAL}\left(\frac{u}{\lambda}\right) e^{j2\pi\sin\theta} d\left(\frac{u}{\lambda}\right) \quad \text{Equation (1b)}$$

The implication of Equations 1a and 1b is that the CLA of $N_{CLA}$ receive antenna elements whose aperture dimension is $D_{CLA}$, can be realized as the product of a transmit array of length $D_T$ with $N_T$ transmit elements and a receive array of length $D_R$ with $N_R$ receive elements, where:

$N_{CLA} = N_T N_R$ $d_R = \lambda/2$ $D_R = (N_R - 1)d_R$ $D_T = (N_T - 1)d_T$ $d_T = D_R$ $D_T = (N_T - 1)(N_R - 1)d_R$ Effective Aperture $= D_T + D_R = N_T(N_R - 1)d_R$ Thus an equivalent 496 element CLA realization with a convolution array (CVA) has only 46 elements in a 23 element transmission array and a 23 element receive array. By contrast, the expensive alternative is a CLA 2D array of $496^2$ (246,016) total elements. The CVA can be configured as two separate linear arrays (one horizontal and one vertical), each employing convolution. This architecture results in a reduction in the number of transmit and receive elements of more than three orders of magnitude from 246,016 (=$496^2$) to 92 (=46×2) total elements.

One architecture of a CVA using the convolution property in practice can be a multi-static time multiplexed radar with $N_T$ separate transmissions and $N_R$ separate receivers. There are $N_T N_R$ unique transmission and reception pairs each with their own round trip path length to a unique scatterer in the far-field. There is a unique mapping between RF phase differences between each unique (T, R) pair in the sparse CVA and the same phase differences found in the fully populated CLA. Thus, in the far-field, the convolution array has a phase gradient across its virtual $N_T N_R$ array elements that is equivalent to that found in the CLA, $N_{CLA} = N_T N_R$.

An alternate architecture for a CVA with a time efficient realization uses code division multiple access (CDMA) so that there are $N_T$ simultaneous transmissions with $N_T$ orthogonal codes. On reception at each of $N_R$ separate receivers, a bank of $N_T$ matched filters separates the $N_T$ orthogonal codes. This is followed by association of the $N_T N_R$ unique transmission and reception pairs each with their own round trip path length to a unique scatterer in the far-field. Subsequent processing mirrors the time domain method.

Figure 10:
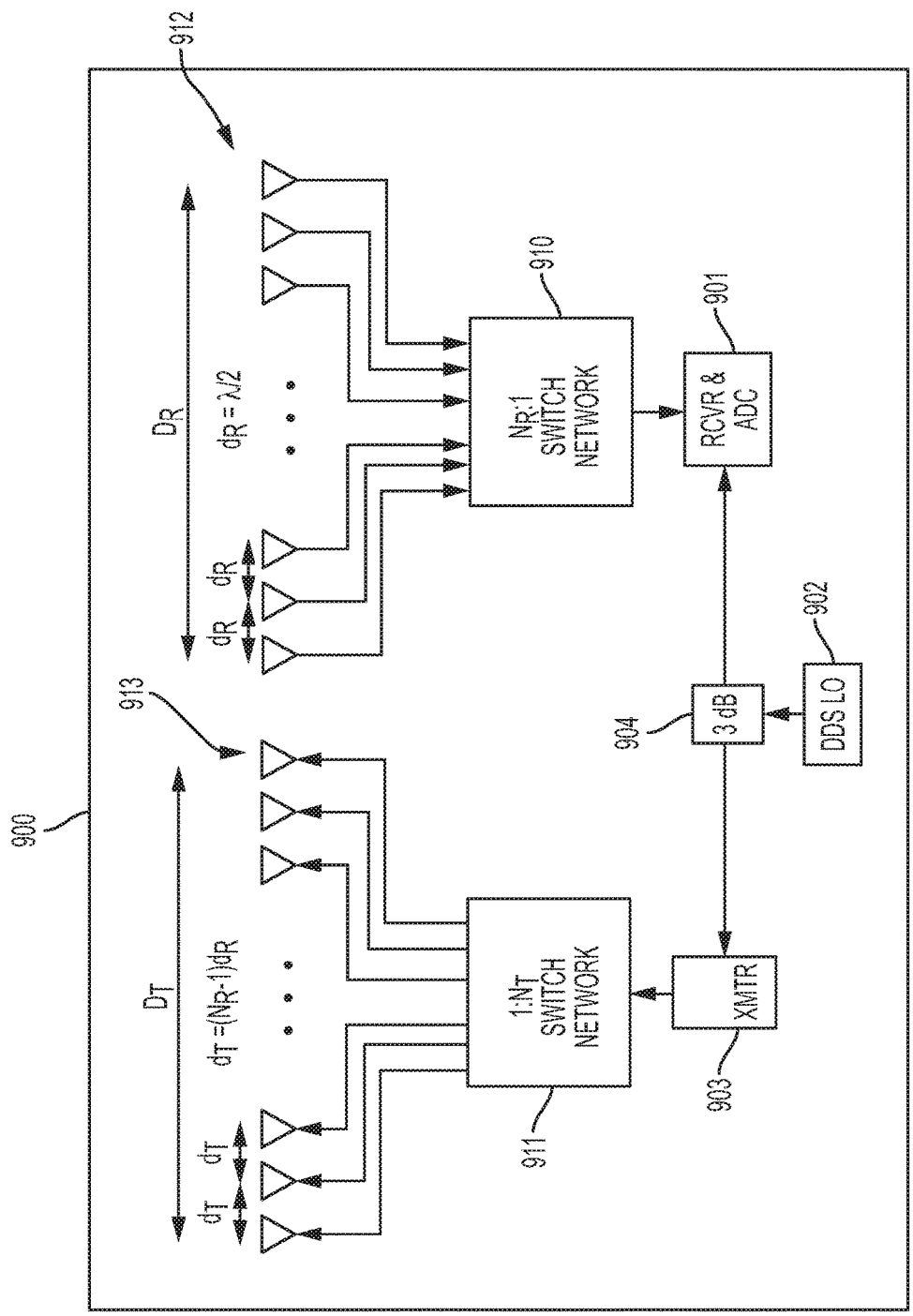
FIG. 10 is a schematic view of an exemplary embodiment of a convolution array for use in the high-definition RF radar system.
Figure 11:
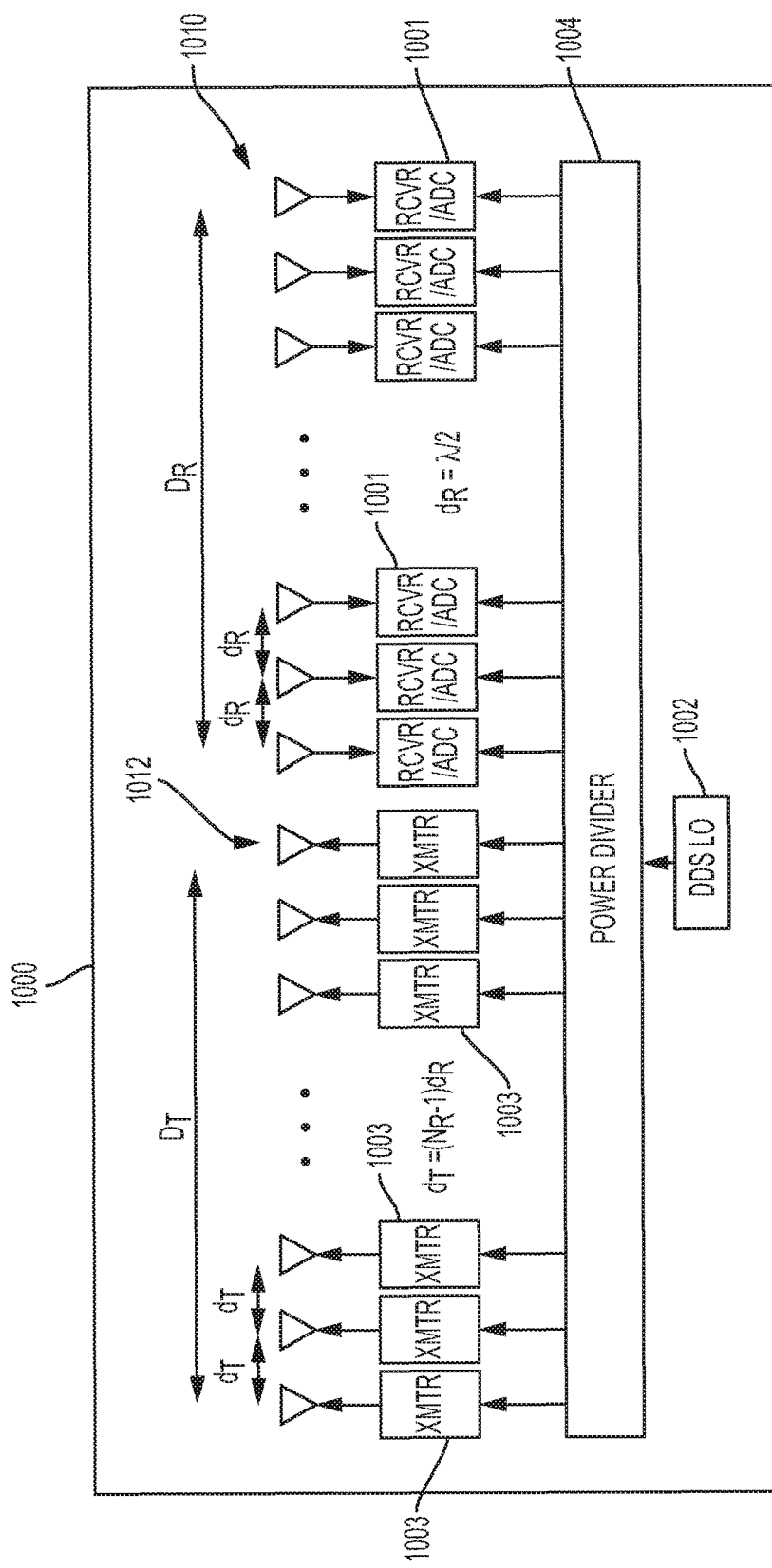
FIG. 11 is a schematic view of an alternate embodiment of a convolution array for use in the high-definition RF radar system.

Generally, a low cost CVA architecture can be obtained by selection of numbers of transmit and receive elements $N_T = N_R = \sqrt{N_{CLA}}$, under the assumption that the RF switch costs, in dollars or performance or both, is much less than the non RF switch costs. An exemplary embodiment of a convolution array 900 that may be used with a high-definition RF radar system, including high-definition RF radar system 110, is shown in FIG. 10. In this embodiment, convolution array 900 includes a receiver and analog-to-digital converter module 901 and a transmitter module 903, with a direct digital synthesis, local oscillator (LO) 902 and 3 dB power divider 904.

In one embodiment, convolution array 900 includes receiver and analog-to-digital converter module 901 using a $N_R$ switch network 910 to provide a plurality of time multiplexed receive antenna elements 912. Similarly, convolution array 900 also includes transmitter module 903 using a $N_T$ switch network 911 to provide a plurality of time multiplexed transmit antenna elements 913. Convolution array 900 performs the transmission operation using RF time-switching among transmit elements 913 and even faster switching of receiver elements 912. The single transmitter module 903 generates an LFM chirp, which constitutes an effective pulse of duration $\tau_p$. This effective transmit pulse is divided into $N_T$ smaller sub-pulses whose period is $$\tau_{pT} = \frac{\tau_p}{N_T}.$$

Else by another option, the transmit sub-pulse period is $$\frac{\tau_{pT}}{q}$$

where q repetitions are taken across plurality of transmit elements 913 during one chirp (i.e., q is an integer greater than 1). With q=1, transmit elements 913 are RF-multiplexed one per $\tau_{pT}$, whereas receive elements 912 are also RF-multiplexed having a still shorter sub-pulse period of $$\tau_{pR} = \frac{\tau_{pT}}{N_R}.$$

In this embodiment, both of these RF multiplex rates can be made much smaller than the radiated chirp bandwidth because, although the stretch operation follows all of this multiplexing, the post-stretch bandwidth affords a much reduced Nyquist rate, which the RF multiplexing rate easily satisfies. On reception, the $N_R$ receive antenna elements 912 are time multiplexed at the faster rate so that all receive elements 912 observe a single transmit sub-pulse r times, where r is an integer chosen to satisfy the Nyquist post-stretch received signal bandwidth. Thus, the aggregate switch rate on receive is $$\frac{qrN_T N_R}{\tau_p}$$

with corresponding demands on the ADC bandwidth. With this architecture, convolution array 900 comprises a single transmitter module 903, a single receiver module 901, fast switches 910, 911, and a low cost high speed ADC (integrated with module 901).

In addition to the architecture of convolution array 900 shown in FIG. 10, other low cost convolution array architectures may be used with a high-definition RF radar system, including high-definition RF radar system 110, which have $N_T$ not equal to $N_R$, with either number of elements exceeding the other. One example of such an alternate architecture is further discussed below.

The architecture of convolution array 900 shown in FIG. 10 can have elevated noise figures on transmission and reception compared to a conventional linear array, such as CLA 800 shown in FIG. 9. For example, on transmission, there are losses that accumulate across the extended path from transmitter 903 through the layer of switches that comprise the 1: $N_T$mux 911, and the antenna elements 913 themselves. On reception, similar losses occur on the path between the receive antenna elements 912, thru the $N_R$:1 multiplex switch complex 910, and receiver 901. Accordingly, for applications which require low noise figures and can afford the increased component costs, an alternate embodiment of a CVA architecture can be provided as a low-loss convolution array 1000, shown in FIG. 11.

In this alternate embodiment, low-loss convolution array 1000 comprises a plurality of $N_T$ transmitters 1003 located as close as possible to a plurality of transmit antenna elements 1012, and a plurality of $N_R$ receivers 1001 are located as close as possible to a plurality of receive antenna elements 1010. In this embodiment, low-loss convolution array 1000 also includes a direct digital synthesis, local oscillator (LO) 1002 and a power divider 1004, which may be substantially similar to local oscillator 902 and power divider 904, described above. With this arrangement, low-loss convolution array 1000 with plurality of receivers 1001 having plurality of receive antenna elements 1010 closely located and plurality of transmitters 1003 having plurality of transmit antenna elements 1012 closely located provides a CVA architecture with lower noise than convolution array 900. Accordingly, in other embodiments, low-loss convolution array 1000 may be used in a high-definition RF radar system for autonomous vehicles that have stricter requirements for noise thresholds.

Figure 12:
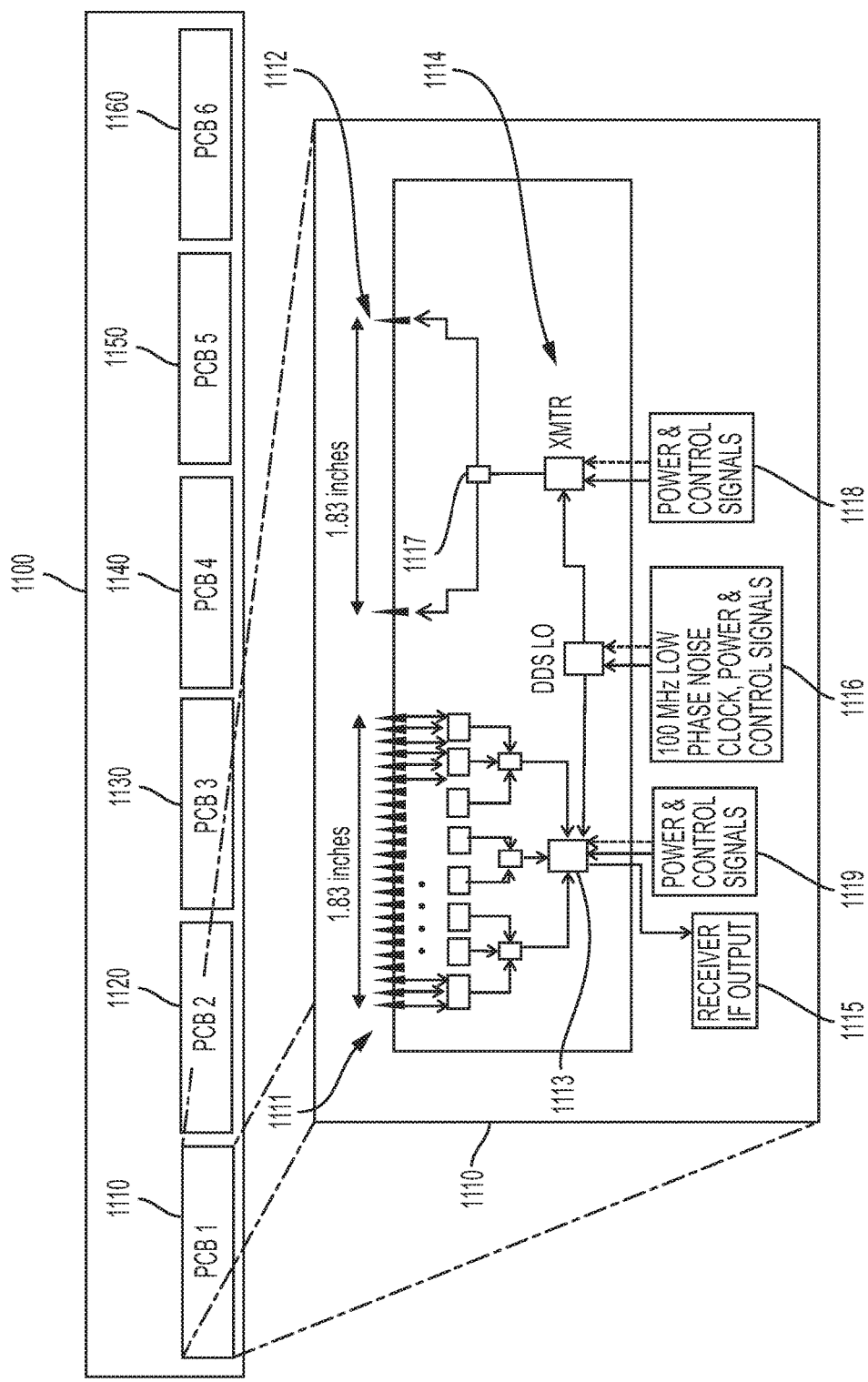
FIG. 12 is a schematic view of a portion of an exemplary embodiment of a linear array for use in the high-definition RF radar system.
Figure 13:
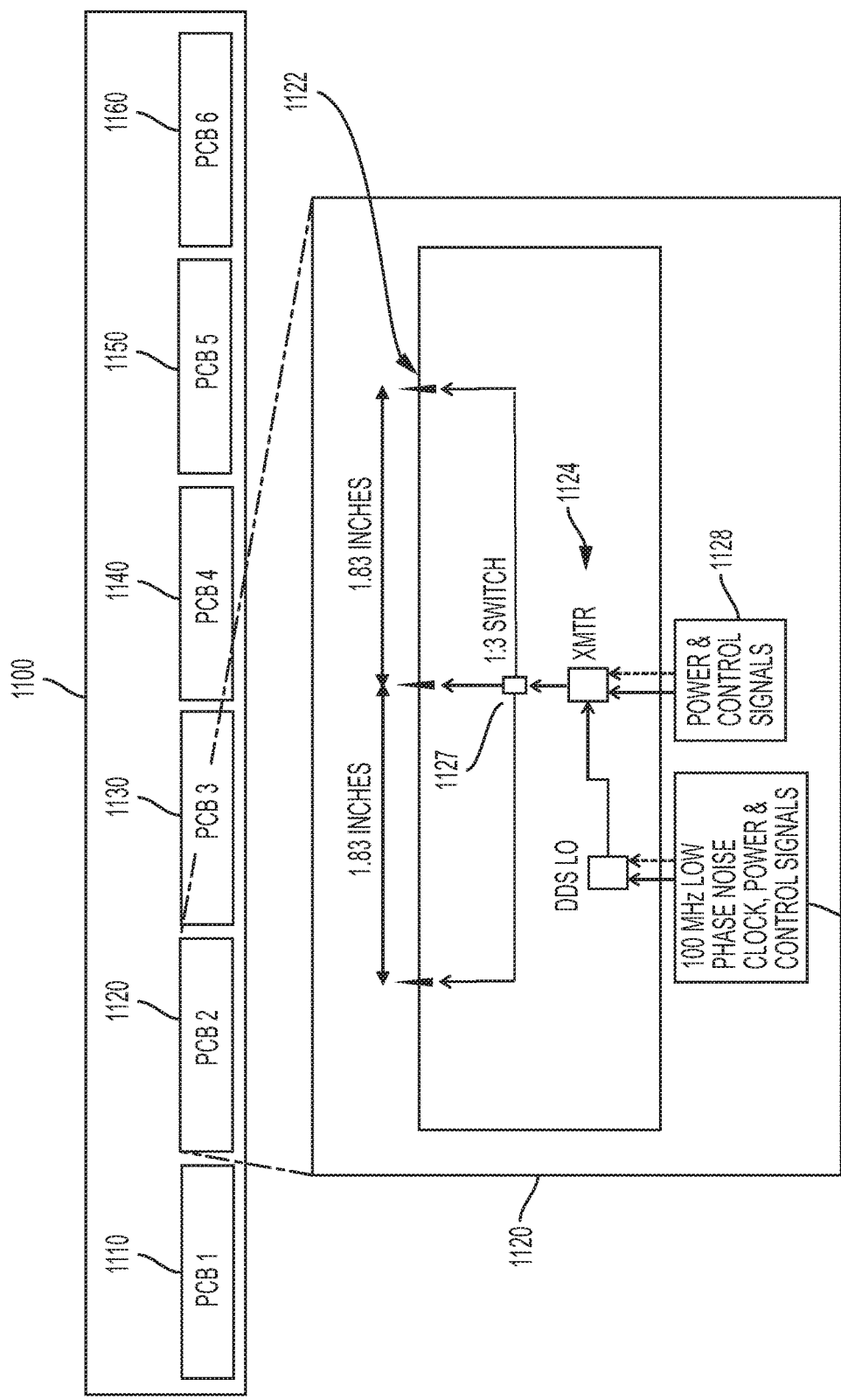
FIG. 13 is a schematic view of another portion of the exemplary embodiment of a linear array for use in the high-definition RF radar system.

The CVA architecture is flexible, the $N_R$ and $N_T$ quantities, with the constraint of $N_{CLA}=N_R N_T$, can be optimized to minimize a metric that includes RF performance, component costs, and manufacturing costs. FIGS. 12 and 13 illustrate an exemplary embodiment of a convolution array 1100 having a CVA architecture comprising 17 transmit elements and 24 receive elements ($N_T$=17, $N_R$=24). In this embodiment, the architecture of convolution array 1100 can be divided into multiple individual printed circuit boards (PCBs) to reduce manufacturing costs and increase yield. In an exemplary embodiment, as shown in FIGS. 12 and 13, convolution array 1100 is split into six separate PCBs, including a first PCB 1110, a second PCB 1120, a third PCB 1130, a fourth PCB 1140, a fifth PCB 1150, and a sixth PCB 1160. In different embodiments, a convolution array may be divided into any number of separate PCBs to accommodate manufacturing and/or size requirements.

Referring now to FIG. 12, first PCB 1110 is shown in detail. In this embodiment, first PCB 1110 has one $N_R$=24 element receive array 1111 feeding switches to a common receiver 1113 and a receiver IF output 1115. The $N_T$=17 element transmit array is distributed across all six PCBs, including transmit elements disposed on each of first PCB 1110, second PCB 1120, third PCB 1130, fourth PCB 1140, fifth PCB 1150, and sixth PCB 1160. In this embodiment, first PCB 1110 includes two transmit antennas 1112 feeding a switch 1117 to a common transmitter 1114. The remaining fifteen transmit antennas can be distributed across the remaining PCBs, including second PCB 1120, third PCB 1130, fourth PCB 1140, fifth PCB 1150, and sixth PCB 1160.

Referring now to FIG. 13, each of the remaining PCBs 2-6, including second PCB 1120, third PCB 1130, fourth PCB 1140, fifth PCB 1150, and sixth PCB 1160 have a substantially similar architecture. Accordingly, second PCB 1120 will be described as exemplary of the configuration for each of the remaining third PCB 1130, fourth PCB 1140, fifth PCB 1150, and sixth PCB 1160. As shown in FIG. 13, second PCB 1120 (and each of third PCB 1130, fourth PCB 1140, fifth PCB 1150, and sixth PCB 1160) has three transmit antennas 1122 with no receivers, and their associated multiplexer 1127 and transmitter circuit 1124. A direct digital synthesis (DDS) of the LO on all boards is derived from a common low phase noise off-board clock 1116, 1126 providing a coherent phase reference between boards. Similarly, power and control signals 1118, 1119, 1128 for all boards may be provided by a common source. Additionally, all PCB I/O can be provided at low frequency to lower manufacturing costs. With this arrangement, the various PCBs forming convolution array 1100 can be manufactured separately and combined to form the array. Moreover, the modular architecture of convolution array 1100 allows for the addition of extra transmit and/or receive antenna elements by inclusion of additional PCBs to the array to increase resolution. Similarly, for embodiments that do not require a high resolution, PCBs may be omitted to decrease resolution of the array.

As previously described with reference to FIGS. 9 through 13, a high-definition RF radar system, including high-definition RF radar system 110, can include CLA or CVA architecture to provide for RF sensor imaging to the radar system. In high-definition RF radar systems using convolution array embodiments, a pair of generally orthogonally disposed linear arrays is used, with each array of the pair having a similar architecture, as described in reference to convolution array 900 of FIG. 10, convolution array 1000 of FIG. 11, and/or convolution array 1100 of FIGS. 12 and 13. Accordingly, to provide the pair of linear arrays, a convolution array having a similar architecture is oriented generally orthogonally with respect to another to form the pair of arrays for the high-definition RF radar system.

Time multiplexed convolution arrays, described above, have several assumptions. The first is that during the collection period of the $N_T N_R$ unique transmission and reception pairs, the illuminated scene is stationary. If the $N_T N_R$ time multiplexing completes in the period of a nominal radar pulse of approximately 20-50 micro-seconds, the relative radial velocity components in automotive applications are slow, resulting in only a degree or two of carrier phase change in the 77-80 GHz band. This would be comparable to the phase spread that would be found in an equivalent CLA.

Another assumption is that the virtual $N_T N_R$ array created by convolution has the same impedance characteristics as the CLA. In an array of elements, the impedance $Z(jw)$, of a selected antenna element varies by mutual coupling with other nearby antenna elements. The impedance matrix for an N element array is:

$$Z = \begin{bmatrix} Z_{11} + Z_o & Z_{12} & & Z_{1N} \\ Z_{21} & Z_{22} + Z_o & \cdots & Z_{2N} \\ \cdots & \cdots & & \cdots \\ Z_{N1} & Z_{N2} & & Z_{NN} + Z_o \end{bmatrix}$$

where $z_{kk}$ represents self-impedance of the antenna k, and $z_{kj}$ represents the mutual impedance between antenna k and j, and $z_o$ is the terminating load. The net impedance seen at the $p^{th}$ antenna terminal is:

$$Z_p = \sum_1^N Z_{pm} \frac{I_m}{I_p}$$

where $I_m$ is the current into the terminal of the $m^{th}$ antenna element.

The relative magnitude and phase contributions to the mutual impedances, $z_{k,j}$, are inversely related to the distance between element k and j. Thus, elements in the center of a long linear array experience similar coupling in contrast to elements at the array ends.

For example, consider a CVA with mutual coupling. Let the CVA be comprised of a receive array of $N_T$=51 transmit element array and $N_R$=5 receive element array with $d_R$=λ/2 spacing. Compared to the CLA, the smaller CVA receive array of only 5 elements has increased mutual coupling since most of the elements are near the edges of the array. As a result, the virtual array of $N_T N_R$ elements has a mutual coupling function that is periodic in $N_R$ elements. The result is a sidelobe increase in the beam pattern compared to the CLA, thereby distorting the field in the CVA.

There are several approaches to reduce the mutual coupling distortion effect in CVAs. The first approach attempts to directly compensate for mutual coupling by signal processing alone. In this approach, let $V_{MC}$ be the measured voltages at each antenna terminal in the presence of mutual coupling. If $V_{NC}$ represents the ideal voltages that would be measured in the absence of mutual coupling, then a coupling matrix, C, maps the two domains, $$V_{MC} = CV_{NC} \qquad \text{Equation (2)}$$

Compensation is accomplished by $V_{NC}=C^{-1}V_{MC}$. However, in practice, there are multiple problems with this approach. First, the practical solution of C is complicated in the near-field since C is a function of Z and the spatial position of the unknown scatterer at (R, α, φ). The latter is easily understood from the array's polarization spatial response in the near-field. Second, most approaches for estimating C without additional hardware assume that the array itself is in free space. In the automotive environment, however, the presence of structural scattering from high dielectric materials, such as an automobile roof (e.g., roof 104 shown in FIG. 1), complicates the model and estimation of C. Accordingly, for practical embodiments using convolution arrays for high definition RF radar systems with autonomous vehicles, a solution for the problem caused by mutual coupling needs to be provided that minimizes the distortion effect so that accuracy and precision of the high definition RF radar system can be maintained at the sidelobes.

Figure 14:
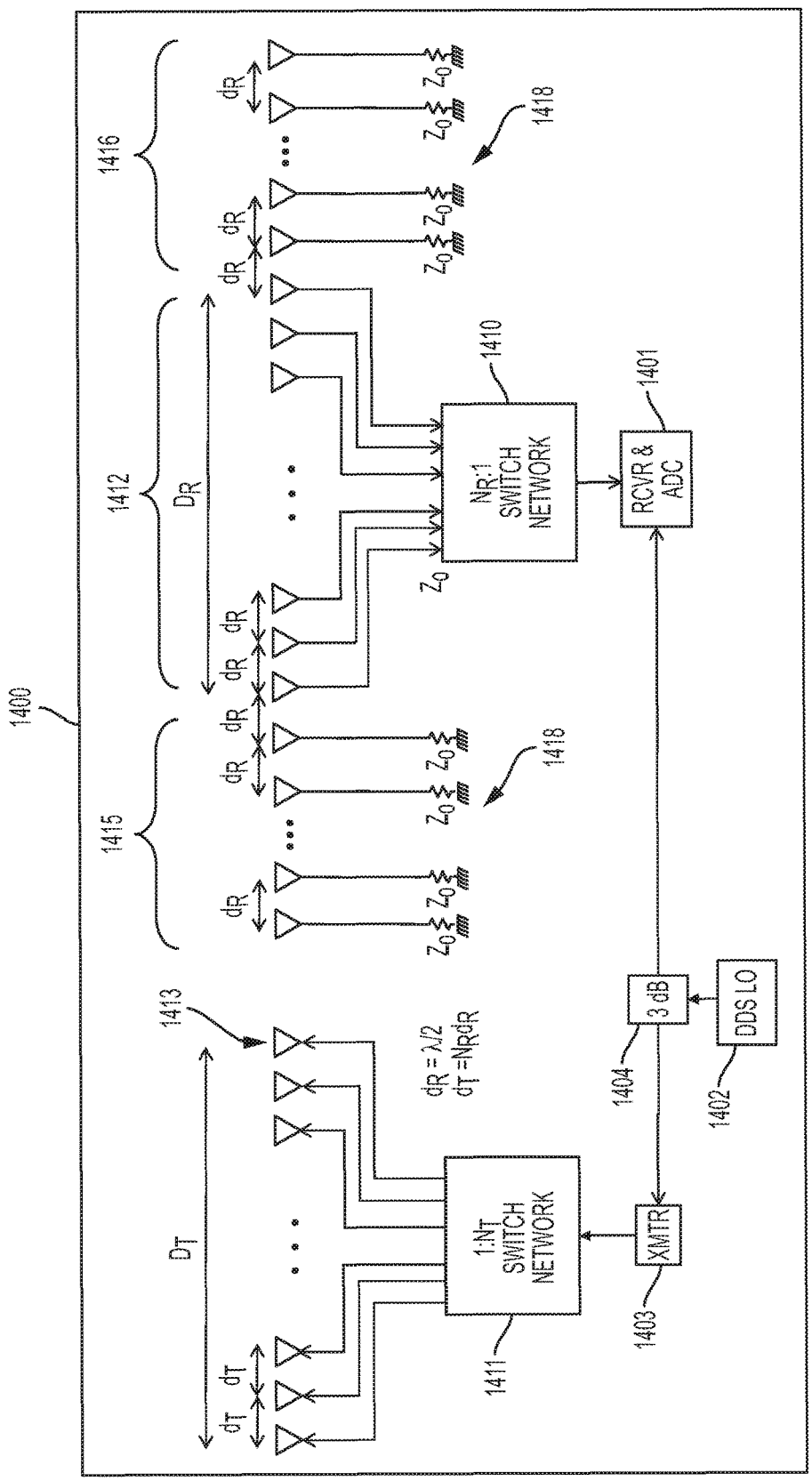
FIG. 14 is a schematic view of an alternate embodiment of a linear array with sacrificial antenna elements for use in the high-definition RF radar system.

In an exemplary embodiment, artifacts of mutual coupling can be minimized by using a convolution array 1400 that includes a plurality of sacrificial antenna elements. Referring now to FIG. 14, convolution array 1400 is illustrated with a similar architecture as previously described embodiments of CVAs above, for example, convolution array 900, including a receiver and analog-to-digital converter module 1401 and a transmitter module 1403, with a direct digital synthesis, local oscillator (LO) 1402 and 3 dB power divider 1404. In this embodiment, transmitter module 1403 uses a $N_T$ switch network 1411 to provide a plurality of time multiplexed transmit antenna elements 1413 and receiver and analog-to-digital converter module 1401 also includes a $N_R$ switch network 1410 to provide a plurality of time multiplexed receive antenna elements 1412.

As compared to previous CVA embodiments, however, convolution array 1400 also includes sacrificial antenna elements disposed on both sides of the receive antenna $N_R$ elements 1412 to minimize the artifacts caused by mutual coupling. As shown in FIG. 14, the sacrificial antenna elements of convolution array 1400 include a first set of sacrificial antenna elements 1415 disposed to the left of receive antenna elements 1412 and a second set of sacrificial antenna elements 1416 disposed to the right of receive antenna elements 1412. First and second sets of sacrificial elements 1415, 1416 are designed to be impedance matched, $Z_o$ 1418, with the real $N_R$ receive antenna elements 1412. Thus, first set of sacrificial antenna elements 1415 and second set of sacrificial antenna elements 1416 exhibit the same, nominally matched impedance 1418 with electric load as receive antenna elements 1412 on either side, however, first set of sacrificial antenna elements 1415 and second set of sacrificial antenna elements 1416 do not receive. The result is that first set of sacrificial antenna elements 1415 and second set of sacrificial antenna elements 1416 cause the distortion from mutual coupling to be made substantially uniform on both sides of receive antenna elements 1412. With this arrangement, convolution array 1400 reduces the edge effects of mutual coupling at very low cost and improves accuracy and precision of the high definition RF radar system at the sidelobes.

Figure 15:
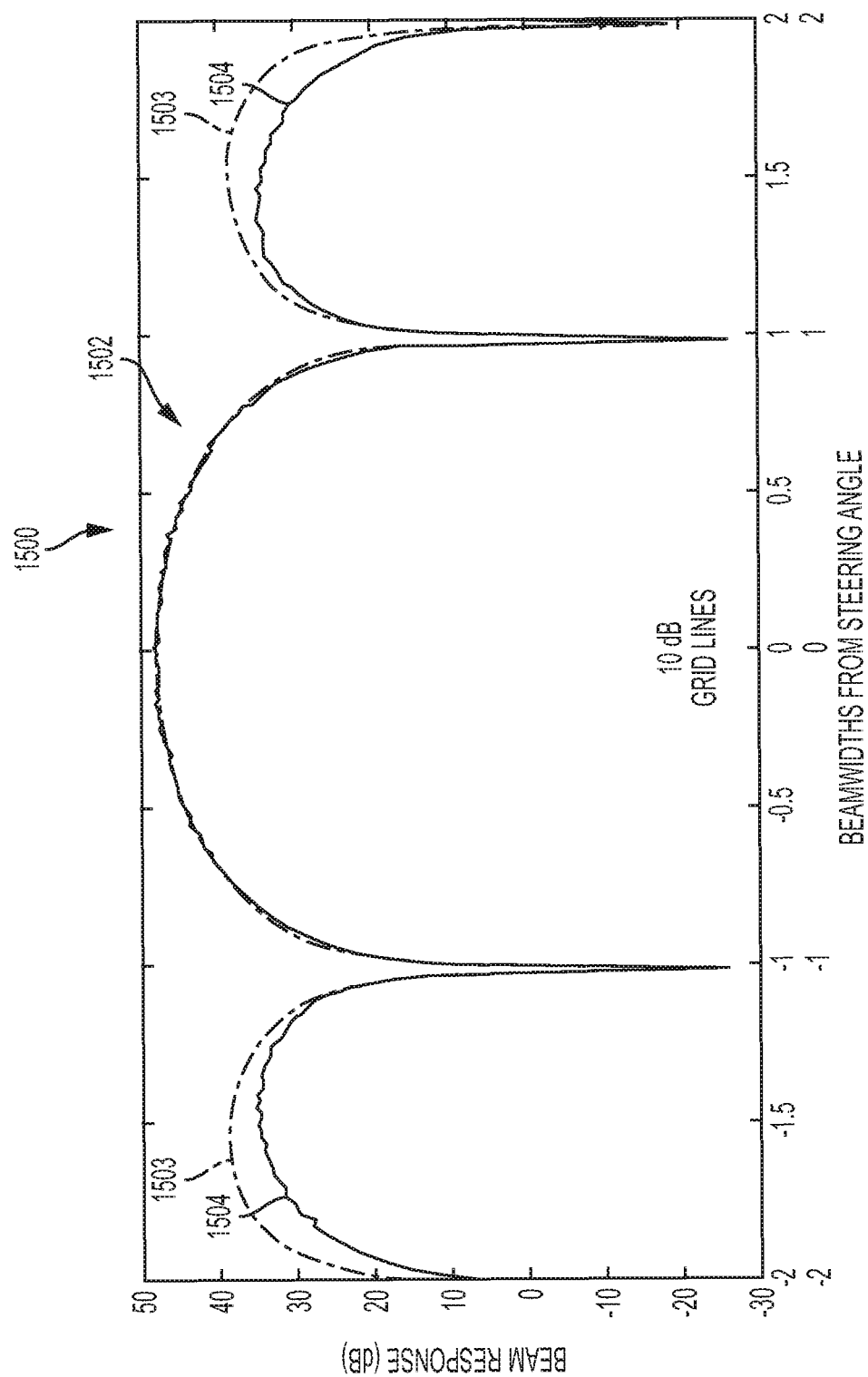
FIG. 15 is a representative graphical comparison of the effect of the sacrificial antenna elements in the high-definition RF radar system.

A representative comparison of the sidelobe response of a CVA with and without sacrificial elements around the receive array, for example, convolution array 1400 compared to convolution array 900, is illustrated in FIG. 15. In FIG. 15, graph 1500 is for a target in the near-field at a 25 foot range and illustrates the beam response versus beamwidths from steering angle. As seen in FIG. 15, main beam 1502 is approximately the same for a CVA with and without sacrificial elements around the receive array. However, in the sidelobes to the left and right of main beam 1502, the dashed line 1503 represents a CVA ($N_T$=51, $N_R$=5) with 7.8 milliradian beamwidth in the presence of receive array mutual coupling. The solid line 1504, is the same CVA architecture modified with P=4 sacrificial elements, 2 on each side of the $N_R$=5 receive array, to reduce mutual coupling. For the target range, the modified CVA with sacrificial elements has a sidelobe reduction of 4+ dB. Accordingly, by using a convolution array with sacrificial elements, for example, convolution array 1400, described above, the distortion effect caused by mutual coupling is minimized so that accuracy and precision of the high definition RF radar system can be maintained at the sidelobes.

As previously described above, the present embodiments of high definition RF radar system 110 use a coordinated radar processor 120 to receive data inputs from first linear array 112 and second linear array 114 and perform an association method to determine whether the data indicates a true target detection or a ghost (i.e., a false detection). In these embodiments, first linear array 112 and second linear array 114 are non-coherent. This arrangement allows each linear array to be separately and independently positioned with respect to the other without requiring a coherent, networked transmitter between each array. The absence of coherence reduces costs and has an advantage in not requiring inter-array calibration, especially in high vibration environments.

Association methods for coherent, networked 3D arrays are known in the art. However an efficient, low false target association method to form 3D data from "incomplete" 2D non-coherent arrays in the presence of spatial quantization noise is lacking. The known association methods do not address the problem of "ghost" or false target formation that develops in the association process with incomplete 2D arrays. Ghost formation is a function of spatial resolution, the non-linear discriminant function to be described, and spatial noise. Accordingly, ghost formation is a challenging problem in dense scenes (e.g., containing multiple targets) such as those encountered by autonomous vehicles.

Generally, two orthogonal 2D arrays can be referred to as a "Boolean" pair. The Boolean pair is non-coherent with respect to each other. The association across the Boolean pair to form a 3D voxel measurement and detection can occur both in fast-time (single pulse), or in slow-time (multiple pulses with Doppler). As will be described in more detail below, exemplary embodiments of coordinated radar processor 120 provide for Boolean fast-time data association with low ghost or false target generation in a high definition RF radar system 110 for an autonomous vehicle.

In some embodiments, coordinated radar processor 120 provides a geometry based method to correctly associate 3D data from two independent orthogonally oriented 2D arrays. This data association method applies to both conventional linear arrays and convolution arrays, including, but not limited to CLA 800, as well as one or more of CVA 900, CVA 1000, CVA 1100, and/or CVA 1400, described above.

First, consider two independent orthogonally oriented arrays deploying radar waveforms that are also orthogonal in either time, frequency, and/or code space. The transmission beam for each array can cover a wide field of view in both azimuth and elevation. On receive, the same field of view is fully sampled with simultaneous receive beams formed in the digital processor.

Generally, a given transmit phase-center can be realized by selecting a subset of available transmit elements in a CLA, and this phase center is further determined by applying an arbitrary transmit weighting function to the beamformer. Likewise, a given receive phase center can be realized by selecting a subset of available receive elements in a CLA and also by applying an arbitrary receive weighting function to the beamformer. The present embodiments of coordinated radar processor 120 use an association method that applies to any selected transmit phase-center and receive phase-center, as well as to combinations of varied phase centers implemented via time-sequential transmission elements else simultaneous orthogonally encoded transmission elements.

Beam steering and range alignment are both necessary and accomplished in either 2D CVA or CLA linear arrays as follows. A particular two-way range hypothesis, $R_{2way}$ and a particular narrow beam direction hypothesis, for example the receiver beam angle, $\alpha$, are selected. Any and all time-sequential transmissions among individual array elements of a CLA, else encoded simultaneous transmissions among individual array CLA elements can be accommodated by an exemplary embodiment of Boolean associator 124 (shown in FIG. 2), described in more detail below. In order to enable the CLA to itself implement a single two-way range hypothesis, $R_{2way}$, many two-way range alignments need to be performed among all transmit/receive combinations, each being done by time-multiplexed transmissions, else by orthogonally-encoded, simultaneous element transmissions. Furthermore, among these many said transmissions and their corresponding receptions, many two-way near-field phase steering alignments are also necessary to enable the CLA to implement a single narrow beam steered in a particular beam direction. A wide transmit beam via a few transmit elements in the CLA, and a narrow receive beam formed by many CLA elements is but one beam-product example of the CLA. For example, the azimuth CLA implements an azimuth beam-product (transmit by receive beam) by near-field phase-steering among say $N_T$ transmit elements and also among $N_R$ receive elements comprising the azimuth CLA. Either the transmit beam, else receive beam can be narrower than the other.

Now, in the case of a CLA Boolean pair array, the elevation Boolean partner CLA can accomplish these same tasks by similar operations. Thus an azimuth CLA range and angle steering hypothesis leads to a particular range bin and a particular azimuth beam angle. And this one azimuth angle-range pair among N such implemented pairs spanning a given volume must be associated with any and all similar elevation angle-range pairs among M such implemented pairs from the elevation Boolean array. The objective is to find only those azimuth pairs that correctly associate with elevation pairs because such associations are defined to be correct when they are actually produced by objects (or more generally by resolved scatterers of objects). This objective leads to a high performance Boolean associator, and near optimal, resolution-limited, imaging in any dense scene.

For the two orthogonal arrays, the 3D geometry based data association problem is how to correctly associate a quantized measurement 2D data pair (range$_1$, angle$_1$) from a first array, with a 2D data pair (range$_2$, angle$_2$) from a second array, that culminates in accepting the detection of a 3D true target, and not of a miss-association. Incorrect pair miss-associations can generate false or "ghost" targets where real targets are absent. If N target detections are found by the first array and M for the second array, there are NM association tests to be performed. In dense scenes, for example, an urban environment with multiple objects/potential targets, N and M each could easily be 4 orders of magnitude. The generation of only a small percentage of false or "ghost" targets can severely degrade the resulting 3D radar images and burden downstream processing with severe consequences for scene interpretation and safe navigation by autonomous vehicles. For example, the autonomous vehicle may incorrectly react to a miss-association "ghost" target and/or may fail to react to a real or true target, due to the effects of such ghost detections.

Figure 16:
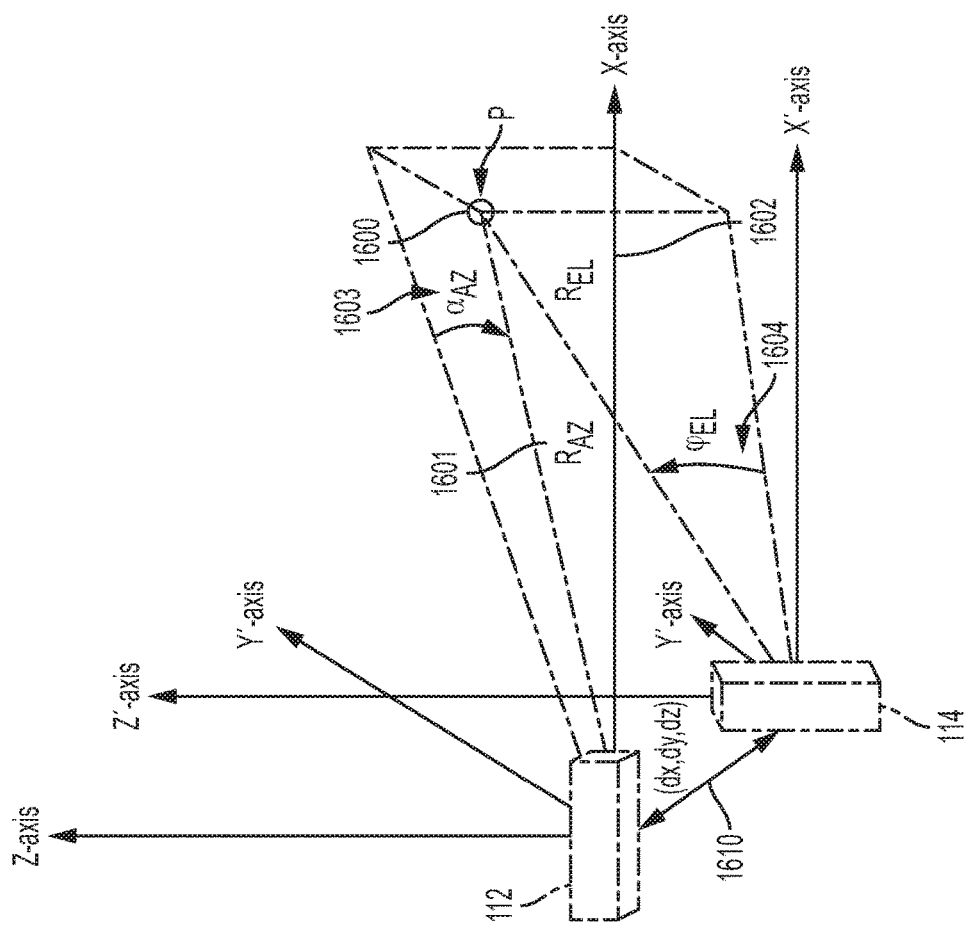
FIG. 16 is a representative view of target object detection and imaging by the high-definition RF radar system.

Referring now to FIG. 16, the method of data association by Boolean associator 124 will be described in more detail with reference to an exemplary embodiment of a high definition RF radar system, for example, high definition RF radar system 110, described above. In this embodiment, first array 112 can be an azimuthal array having a generally horizontally oriented aperture whose phase center (and physical center) is at the origin of a 3D Cartesian coordinate system (x, y, z). The other array of the Boolean pair, second array 114, is an elevation array having a generally vertically oriented aperture whose phase center (and physical center) is spaced apart from the origin by offset 1610 (dx, dy, dz). The aforementioned beam steering phases and range alignments implemented independently in say an azimuth array give rise to a common quantized observable angle, $\alpha_{AZQ}$ and a common quantized observable range, $R_{AZQ}$ to be discussed in more detail after true analog variables are defined. After similar steering phases and range alignments, a quantized observable range, $R_{ELQ}$, and likewise a quantized angle $\varphi_{ELQ}$, are available from the elevation array.

For a given target P 1600 located at $(x_t, y_t, z_t)$, let $(R_{AZ}, \alpha_{AZ})$ be the corresponding analog range 1601 and azimuthal angle 1603 relative to the horizontal aperture of first array 112, and $(R_{EL}, \varphi_{EL})$, be the corresponding analog range 1602 and elevation angle 1604 relative to the vertical aperture of second array 114. The target and aperture geometries as shown in FIG. 16, yield the relations in equations (3a-3d):

$$x_t^2 + y_t^2 + z_t^2 = R_{AZ}^2 \qquad \text{Equation (3a)}$$

$$(x_t - dx)^2 + (y_t - dy)^2 + (z_t - dz)^2 = R_{EL}^2 \qquad \text{Equation (3b)}$$

$$z_t - dz = R_{EL} \sin \varphi_{EL} \qquad \text{Equation (3c)}$$

$$y_t = R_{AZ} \sin \alpha_{AZ} \qquad \text{Equation (3d)}$$

The first array 112 and second array 114 report quantized measurements of $(R_{AZQ}, \alpha_{AZQ})$ and $(R_{ELQ}, \varphi_{ELQ})$. There is a corresponding estimated quantized target position $(x_{tQ}, y_{tQ}, z_{tQ})$ of target 1600 that may be found from:

$$x_{tQ}^2 + y_{tQ}^2 + z_{tQ}^2 = R_{AZQ}^2 + err_1 \qquad \text{Equation (4a)}$$

$$(x_{tQ} - dx)^2 + (y_{tQ} - dy)^2 + (z_{tQ} - dz)^2 = R_{ELQ}^2 + err_2 \qquad \text{Equation (4b)}$$

$$z_{tQ} - dz = R_{ELQ} \sin \varphi_{ELQ} + err_3 \qquad \text{Equation (4c)}$$

$$y_{tQ} = R_{AZQ} \sin \alpha_{AZQ} + err_4 \qquad \text{Equation (4d)}$$

Where $err_k$ represents the $k^{th}$ unknown including the spatial quantization noise. One approach for association is to numerically search for an estimated quantized target position that minimizes the sum of the squared errors, $$\text{Cost} = \min_{x_{tQ}, y_{tQ}, z_{tQ}} \Sigma_{k=1}^{4} \gamma_k err_k^2 \qquad \text{Equation (5a)}$$

where $\gamma_k$ are relative weights, and $err_k$ is from Equations (4a-4d), $$err_1 = x_{tQ}^2 + y_{tQ}^2 + z_{tQ}^2 - R_{AZQ}^2 \qquad \text{Equation (5b)}$$

$$err_2 = (x_{tQ} - dx)^2 + (y_{tQ} - dy)^2 + (z_{tQ} - dz)^2 - R_{ELQ}^2 \qquad \text{Equation (5c)}$$

$$err_3 = z_{tQ} - dz - R_{ELQ} \sin \varphi_{ELQ} \qquad \text{Equation (5d)}$$

$$err_4 = y_{tQ} - R_{AZQ} \sin \alpha_{AZQ} \qquad \text{Equation (5e)}$$

One method determines association between $(R_{AZQ}, \alpha_{AZQ})$ and $(R_{ELQ}, \varphi_{ELQ})$ if the Cost determined in Equation (5a) is less than a predetermined threshold, with the threshold being a function of the desired resolution and corresponding accuracy. The search incurs a costly time penalty to perform the 3D search over $(x_{tQ}, y_{tQ}, z_{tQ})$, the cost growing as the product of the number of detections in the generally orthogonal arrays.

One alternative approach employed in the prior art is to perform association with range only. For the phase incoherent pair of radar arrays (e.g., first array 112 and second array 114) illustrated in FIG. 16, a legacy association method would be realized as:

$$|R_{AZQ} - R_{ELQ}| \leq G Threshold_1 \Rightarrow \text{Association} \qquad \text{Equations (6a)}$$

$$|R_{AZQ} - R_{ELQ}| > G Threshold_1 \Rightarrow \text{Association} \qquad \text{Equations (6b)}$$

where, $$GThreshold_1 = \mu \sqrt{dx^2 + dy^2 + dz^2} \qquad \text{Equation (6c)}$$

and $\mu$ is a scalar weighting term.

One problem with this above-described legacy association method, however, is that it is far too lenient with respect to ghosts or false detections, especially when the spatial distance given by the square root in Equation (6c) is large with respect to resolution, notably range. The leniency of this legacy association method generates many ghosts, which can burden the downstream image processing and further generate blurred or incorrect images that degrade the localization and situational awareness for autonomous vehicles. These degradations can be severe and devastating to imaging and estimation functions and cause problems for navigation and/or control of the autonomous vehicle.

According to an exemplary embodiment, Boolean associator 124 uses a new Boolean association method that is time efficient and generates far fewer ghosts with improved image quality in the presence of spatial quantization noise. This Boolean association method requires two types of constraints to be satisfied simultaneously: one, geometric constraints; and two, a detection constraint. Thus, Boolean associator 124 is more optimally configured to compare the data from the pair of linear arrays, for example, first linear array 112 and second linear array 114, and declare a correct or true target association if both (a) the geometric constraints, and (b) the detection constraint are met. The Boolean association method used by Boolean associator 124 will be further described in more detail below in relation to Equations (7a-7c), (8a-8c), (9a-9b), and (10) below. First, geometric constraints and their associated thresholds will be discussed.

In an exemplary embodiment, the Boolean association method directly calculates two separate estimates of the quantized target x-coordinate position. A metric that is a function of the Euclidean distance between the two quantized target positions is compared to a threshold to declare association. In this embodiment, the metric is an association discriminant that is formed as the Euclidean distance between the two quantized target 3D positions with a certain normalization based on the one-way measured ranges from each array to the common object in the case of correct association, else to a miss-associated ghost in the other case. This association discriminant is compared to a threshold to declare a potential correct or true target association versus incorrect or ghost association.

The process for generating two separate estimates of quantized target positions is described next. Rewriting Equations (4a-4d) above, without the error terms, as two equation sets, each containing 3 equations and 3 unknown target positions. Equation set I is:

$$(x_{tQ1} - dx)^2 + (y_{tQ1} - dy)^2 + (z_{tQ1} - dz)^2 = R_{ELQ}^2 \qquad \text{Equation (7a)}$$

$$z_{tQ1} - dz = R_{ELQ} \sin \varphi_{ELQ} \qquad \text{Equation (7b)}$$

$$y_{tQ1} = R_{AZQ} \sin \alpha_{AZQ} \qquad \text{Equation (7c)}$$

and equation set II is:

$$x_{tQ2}^2 + y_{tQ2}^2 + z_{tQ2}^2 = R_{AZQ}^2 \qquad \text{Equation (8a)}$$

$$z_{tQ2} - dz = R_{ELQ} \sin \varphi_{ELQ} \qquad \text{Equation (8b)}$$

$$y_{tQ2} = R_{AZQ} \sin \alpha_{AZQ} \qquad \text{Equation (8c)}$$

By construction, the spatial quantization noise is embedded in the quantized target positions. The first estimated target position, $[x_{tQ1} \; y_{tQ1} \; z_{tQ1}]$, is obtained by analytic solution of Equations (7a-7c), and the second estimated target position $[x_{tQ2} \; y_{tQ2} \; z_{tQ2}]$, is similarly obtained from Equations (8a-8c). Target position solutions that contain non-zero imaginary components represent invalid associations and are pre-declared as "No Association" (i.e., ghosts).

Consider the association discriminant, β, defined as:

$$\beta = \frac{\sqrt{|R_{SQI} - R_{SQII}|}}{|R_{AZQ} - R_{ELQ}|}. \qquad \text{Equation (9a)}$$

Observe that Equation (9a) is firstly a function of the absolute difference of two squared-ranges, namely $R_{SQ1}$ and $R_{SQ11}$, defined by:

$$R_{SQ1} = x_{tQ1}^2 + y_{tQ1}^2 + z_{tQ1}^2$$

$$R_{SQ11} = x_{tQ2}^2 + y_{tQ2}^2 + z_{tQ2}^2$$

Each squared range is derived from the sum of the square of the estimated 3D target position components of an equation set, said components being obtained as the solution to the respective equation set. The association discriminant, β, further incorporates a normalization by the square-root of the absolute difference of the two measured ranges, namely $R_{AZQ} - R_{ELQ}$.

In an exemplary embodiment, Boolean associator 124 will declare the necessary geometric constraints met for Boolean association between any pair $(R_{AZQ}, \alpha_{AZQ})$ and $(R_{ELQ}, \varphi_{ELQ})$ if both (1) the association discriminant, β, is less than or equal to a first threshold value, and (2) a difference between quantized range values from the pair of arrays is less than or equal to a second threshold value. That is the first type of constraint, geometric constraints, required for "Association" or true target detection is found when:

$$\beta \leq G\text{Threshold}_2 \text{ AND } |R_{AZQ} - R_{ELQ}| \leq G\text{Threshold}_1. \qquad \text{Equation (9b)}$$

Otherwise, "No Association" or ghost detection is declared. Selected constant threshold values, $G\text{Threshold}_1$ and $G\text{Threshold}_2$ are defined for these tests.

As defined, the association discriminant, β, is in units of the square-root of distance, although other normalization powers in the denominator are also possible, including one that makes β dimensionless. Those skilled in the art will realize that this binary hypothesis test can be modified to include certain discriminant versions, distinct from β, as defined here; and such versions can lead to performance similar to that of β. For example, excellent associator performance is achievable with more than one selection of the normalization power, combined with the specified numerator of this method. A generalization of Equation (9a) is:

$$\beta_k = \frac{f(R_{SQI}, R_{SQII})}{g(R_{AZQ}, R_{ELQ})}, \qquad \text{Equation (10)}$$

Where $f(R_{SQ1}, R_{SQ11})$ is a generalized function of the difference between $R_{SQ1}$ and $R_{SQ11}$ including non-unit norms, and similarly for $(R_{AZQ}, R_{ELQ})$. For each $\beta_k$, there is a corresponding threshold test. The intersection of the family of k tests can further reduce ghost detections, albeit with more computation required.

As stated above, both (a) the earlier geometric constraints, and (b) the detection based constraint must be simultaneously satisfied to declare a fast-time association across the Boolean pair using the Boolean association method. The first type of constraint, geometric constraints, is met by satisfying the above requirements in relation to the first and second threshold values as stated in Equation (9b). Next, the second type of constraint, a detection constraint, must also be met before Boolean associator 124 can declare a correct or true target association is met. The requirements for a detection constraint and its associated threshold value will be discussed.

Referring back to FIG. 16, the Boolean pair of arrays, first array 112 and second array 114, returns two sets of fast-time measurements that include both geometry and signal voltage. The horizontal first array 112 returns the data triplet, $(R_{AZQ}, \alpha_{AZQ}, v_{AZ})$, that includes a voltage, $v_{AZ}$ for the azimuth fan beam at $(R_{AZQ}, \alpha_{AZQ})$. A similar triplet measurement, $(R_{ELQ}, \varphi_{ELQ}, v_{EL})$, where $v_{EL}$ is the voltage is returned from vertical second array 114 for the elevation fan beam at $(R_{ELQ}, \varphi_{ELQ})$.

In the exemplary embodiment of the Boolean association method, the detection constraint is determined using a detection filter that qualifies a target association with a 3D voxel detection on a single look. This detection filter evaluates a sufficient statistic, $f(v_{AZ}, v_{EL})$ against a threshold, DThreshold, for a desired $P_d$. For the non-coherent pair of arrays, one form of the sufficient statistic for the detection constraint is the joint voltage magnitude product of the received voltages, such as $f(v_{AZ}, v_{EL}) = |v_{AZ}||v_{EL}|$, or a pre-detected Boolean voltage product. By looking to the received voltages, the Boolean associator can reduce thermal noise errors in the measurements to eliminate false alarm "ghost" detections. Thus, in this embodiment, Boolean associator 124 will declare the necessary detection constraint met for Boolean association if the detection filter determines a voltage value is greater than a third threshold value. That is the second type of constraint, a detection constraint, required for "Association" or true target detection is found when this condition is met. Accordingly, if all of (a) the two geometric constraints, and (b) the detection constraint are satisfied, then the resulting detection vector, $(R_{AZQ}, \alpha_{AZQ}, v_{AZ}, R_{ELQ}, \varphi_{ELQ}, v_{EL})$, representing the linear array data for the true target detection is passed by Boolean associator 124 to downstream processing by 4D scene imaging unit 130 of high-definition RF radar system 110, or other suitable processing.

Figure 17:
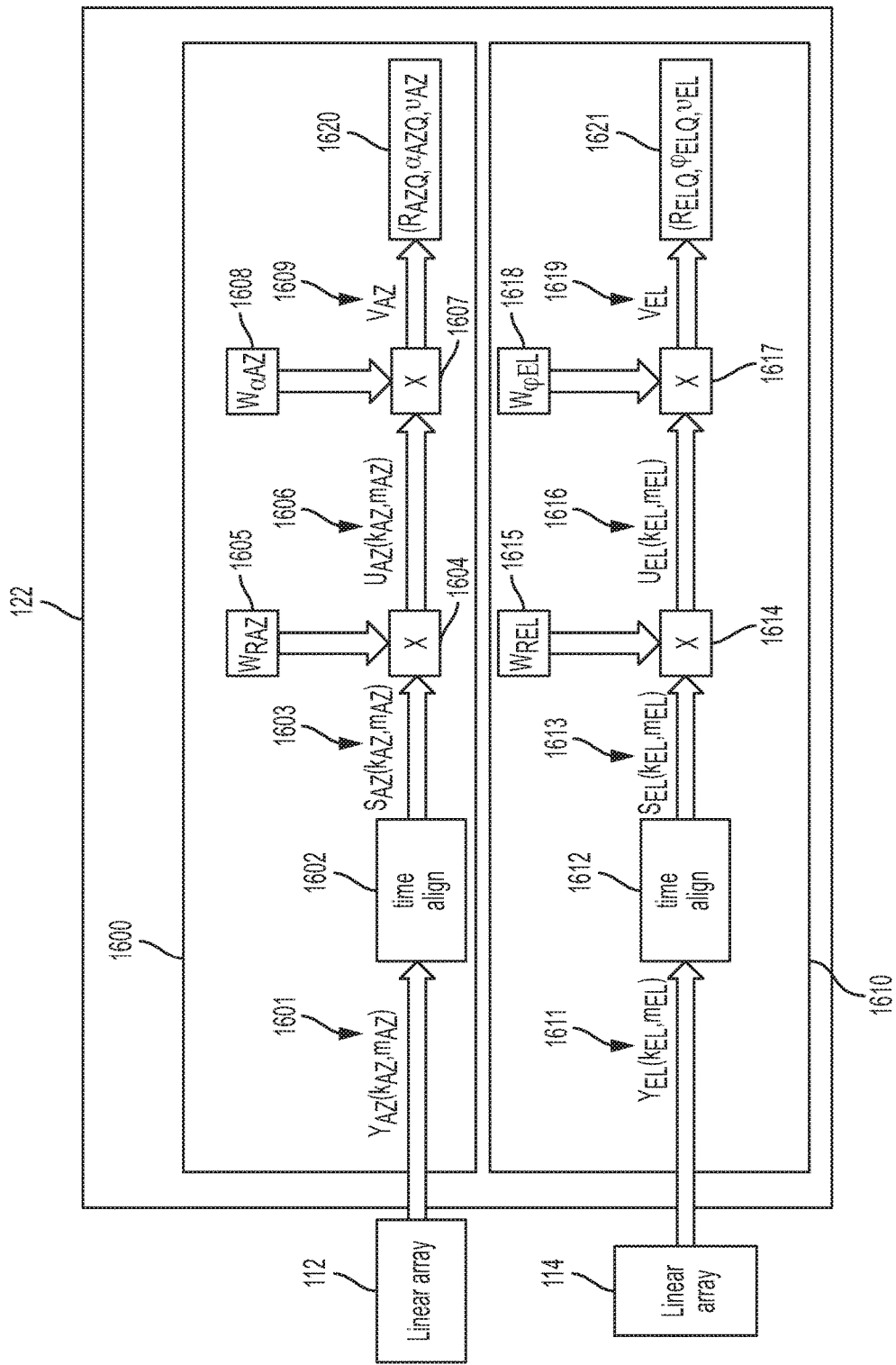
FIG. 17 is a schematic view of an exemplary embodiment of a pre-association conditioner for acquired data from the high-definition RF radar system.
Figure 18:
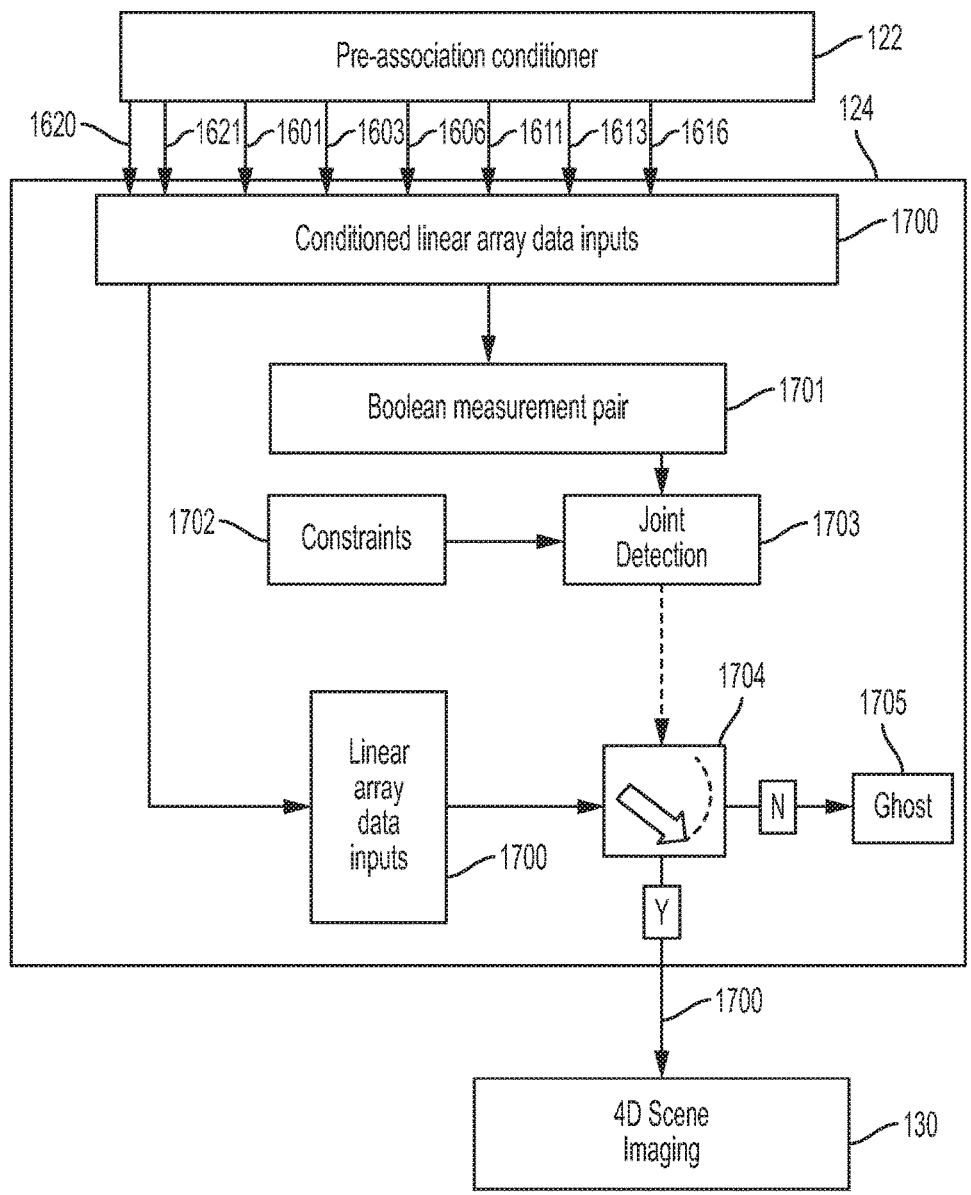
FIG. 18 is a schematic view of an exemplary embodiment of a Boolean associator for target object detection by the high-definition RF radar system.

Referring now to FIGS. 17 and 18, the Boolean association method described above is illustrated with reference to exemplary embodiment of high definition RF radar system 110. In particular, coordinated radar processor 120, which includes pre-association conditioner 122 and Boolean associator 124, correctly associates 3D data from the two independent orthogonally oriented Boolean pair arrays, for example, first array 112 and second array 114. The signal flow of data from first array 112 and second array 114 as raw measurements through fast-time joint geometry and detection Boolean association is described in FIG. 17 and FIG. 18.

Referring now to FIG. 17, pre-association conditioner 122 of high definition RF radar system 110 receives raw measurements from first array 112 and second array 114 and conditions the data for later use by Boolean associator 124. In this embodiment, pre-association conditioner 122 includes a first process 1600 and a second process 1610 that conditions raw measurements from the pair of arrays. First process 1600 receives and conditions raw measurements from first array 112 related to the azimuthal beam data, and second process 1610 receives and conditions raw measurements from second array 114 related to elevational beam data.

First process 1600 receives as an input, time domain data, $Y_{AZ}(K_{AZ}, M_{AZ})$ 1601, where $K_{AZ}$ is quantized time and $M_{AZ}$ is antenna element number, from first array 112. Time domain data 1601 is first time aligned at step 1602 to form $S_{AZ}(K_{AZ}, M_{AZ})$ 1603, and then range match filtered at step 1604 by $W_{RAZ}$ 1605, a function of $R_{AZQ}$, to produce range quantized measurements $U_{AZ}(K_{AZ}, M_{AZ})$ 1606. Range quantized measurements 1606 are near-field beam space match filtered at step 1607 with $W_{\alpha AZ}$ 1608, a function of and with resulting complex voltage $v_{AZ}$ 1609 resulting in the azimuthal measurement triplet $(R_{AZQ}, \alpha_{AZQ}, v_{AZ})$ 1620.

Similarly, second process 1610 follows for second array 114. Second process 1610 receives as an input, time domain data, $Y_{EL}(K_{EL}, M_{EL})$ 1611, where $K_{EL}$ is quantized time and $M_{EL}$ is antenna element number, from second array 114. Time domain data 1611 is first time aligned at step 1612 to form $S_{EL}(K_{EL}, M_{EL})$ 1613, and then range match filtered at step 1614 by $W_{REL}$ 1615, a function of $R_{ELQ}$, to produce range quantized measurements $U_{EL}(K_{EL}, M_{EL})$ 1616. Range quantized measurements 1616 are near-field beam space match filtered at step 1617 with $W_{\varphi EL}$ 1618, a function of $\varphi_{ELQ}$ and $R_{ELQ}$, with resulting complex voltage $v_{EL}$ 1619 resulting in the elevational measurement triplet $(R_{ELQ}, \varphi_{ELQ}, v_{EL})$ 1621. The time alignment 1602, 1612 and vector matrix matched filter operations 1604, 1614, 1607, 1617 can be implemented in parallel pipelined FPGA and GPU hardware for low latency.

An exemplary embodiment of Boolean associator 124 is shown in FIG. 18. In this embodiment, the Boolean measurement triplet pair 1620, 1621, as well as the time domain data 1601, 1611, range aligned data 1603, 1613, and beam aligned data 1606, 1616 matrices for both first array 112 and second array 114 are provided from pre-association conditioner 122 as conditioned data inputs 1700 to Boolean associator 124. The Boolean measurement triplet pair 1701 (i.e., both azimuthal measurement triplet 1620 and elevational measurement triplet 1621) is provided to a joint detection unit 1703 of Boolean associator 124. At joint detection unit 1703, Boolean measurement triplet pair 1701 is jointly evaluated against both the geometric constraints and the detection constraint 1702, as described above. If both types of constraints are satisfied at joint detection unit 1703, a correct or true target association is declared for the given 3D voxel and switch 1704 is enabled which passes a copy of the input data 1700 to the downstream 4D scene imaging unit 130 for subsequent Doppler and image processing followed by scene interpretation. If both types of constraints are not satisfied at joint detection unit 1703, a "no association" or ghost is declared for Boolean measurement triplet pair 1701, and switch 1704 is not enabled, in which case the copy of input data 1700 can be deleted or flagged as a ghost detection.

Accordingly, using the Boolean association method described above, Boolean associator 124 declares a correct or true target association if all of the following conditions are met: (1) an association discriminant is less than or equal to a first threshold value, (2) a difference between quantized range values from the pair of arrays is less than or equal to a second threshold value (i.e., both geometric constraints are met), and (3) a detection filter determines a voltage value is greater than a third threshold value (i.e., the detection constraint is met).

FIGS. 19A-22 illustrate representations of comparisons of object detection and true target association versus ghosts for the conventional legacy associator and the Boolean associator of the present embodiments. An example of different spaced targets each comprised of multiple scatterers, where the scatterers are separated below the sensor's resolution limit is shown for three different examples in FIGS. 19A and 19B, FIGS. 20A and 20B, and FIGS. 21A and 21B. Image performance distinctions for these target comparisons can be made between a conventional legacy associator, with geometry constraint from Equation (6a-6c), in FIGS. 19A, 20A, and 21A, and the Boolean associator 124 with geometry constraint from Equation (9a-9b) in FIGS. 19B, 20B, and 21B.

Figure 19A:
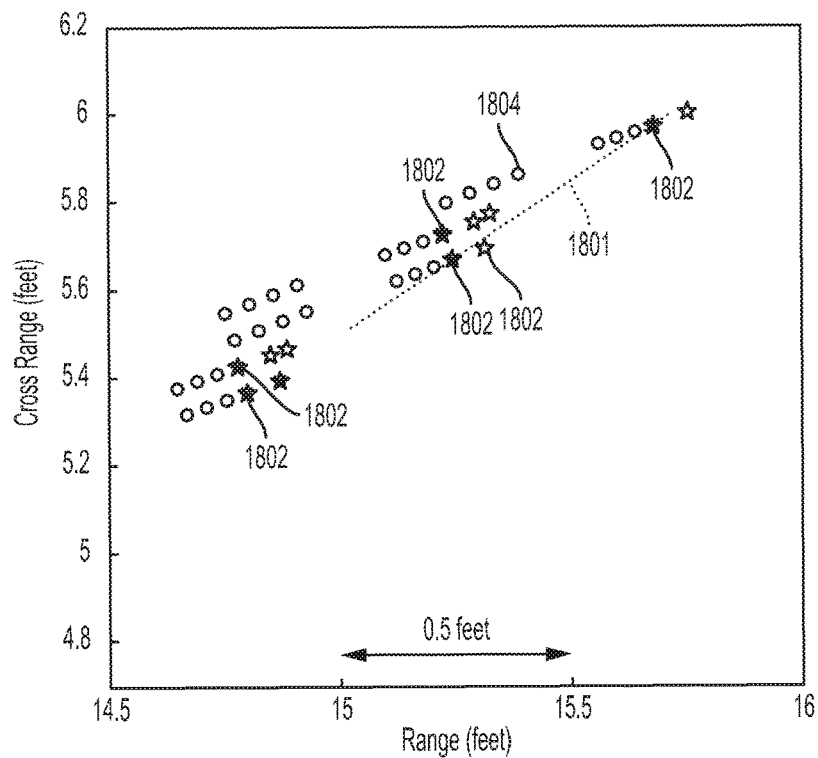
FIG. 19A is a representative graphical view of true target and ghost detection and imaging using a conventional radar system.
Figure 19B:
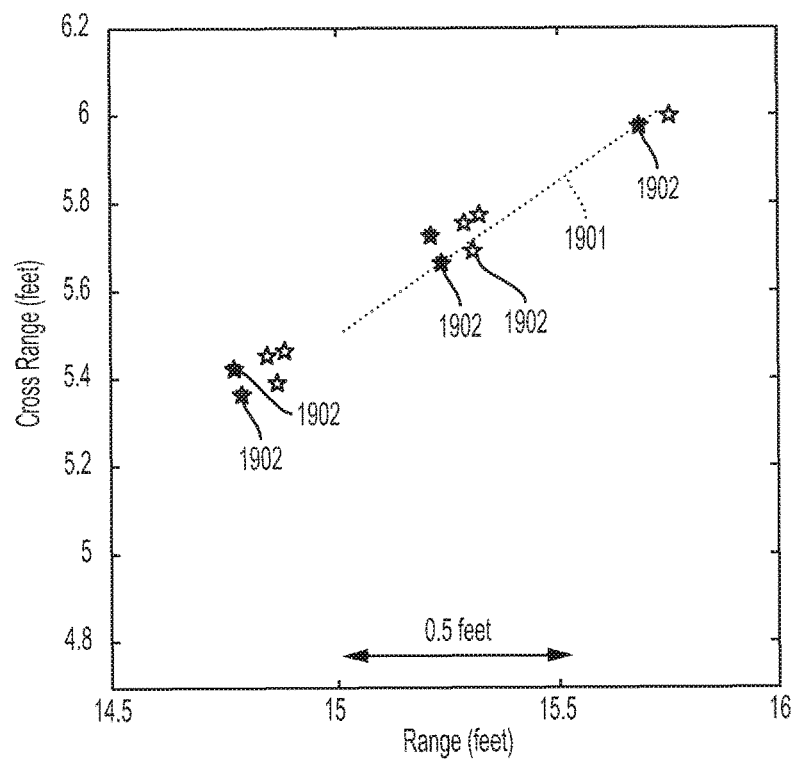
FIG. 19B is a representative graphical view of an exemplary embodiment of true target and ghost detection and imaging using the exemplary embodiment of a high-definition RF radar system.

Referring now to FIGS. 19A and 19B, true analog targets are shown as dotted lines 1801, 1901. All measured and thus quantized locations are either stars 1802, 1902 or circles 1804. Stars 1802, 1902 are correctly associated target locations. Empty circles 1804 illustrate incorrectly associated ghost locations, resulting in degraded image quality.

In FIG. 19A, the legacy associator has an excessive number of ghosts 1804 with larger errors that would result in a distorted image compared to the results of Boolean associator shown in FIG. 19B. In FIG. 19A, multiple ghosts 1804 surround stars 1802 and only a few of stars 1802 are acceptably close to target 1801. Further observe a larger number of ghosts farther from target 1801. By contrast, results from the Boolean associator shown in FIG. 19B include a plurality of stars 1902 disposed acceptably close to target 1901 and none of the unacceptable ghosts 1804 appear in the image produced by the Boolean associator.

The preceding example is actually generous to the legacy associator. Other more dense images having many closely spaced target clusters result in many more legacy ghosts and thus poor image quality. By contrast the Boolean associator handles more dense scenes just as it handles the illustrated scene. In such denser scenes the Boolean associator produces few ghosts, and with high confidence most of the ghosts are essentially co-located with target estimates, resulting in excellent image quality. Thus by contrast to the legacy associator, the few retained ghosts have a minimal effect on the image, its interpretation, and estimated features. Moreover the actual target estimates in the image possess just the minimum error expected of the spatial resolution limits.

Figure 20A:
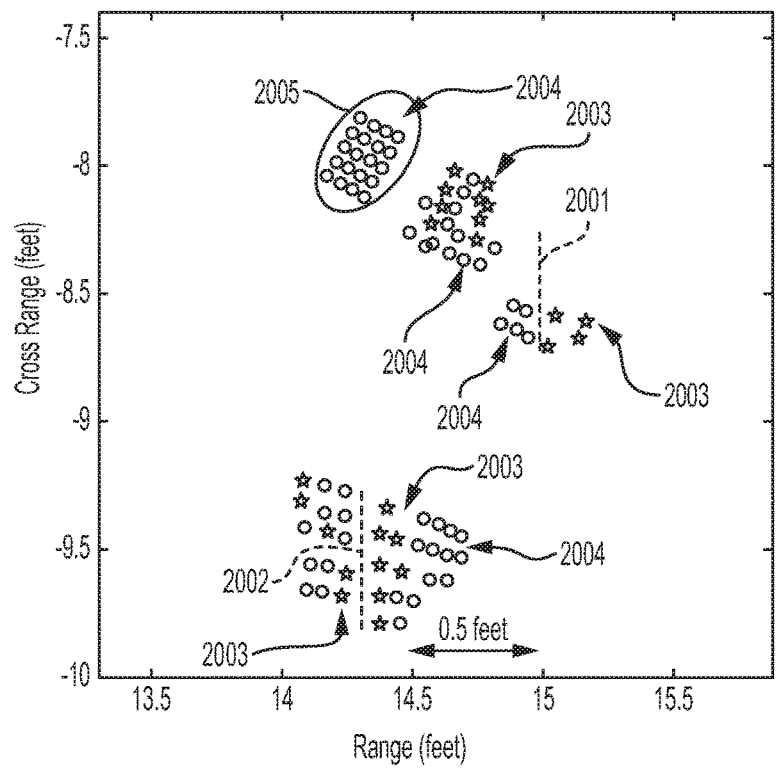
FIG. 20A is another representative graphical view of true target and ghost detection and imaging using a conventional radar system.
Figure 20B:
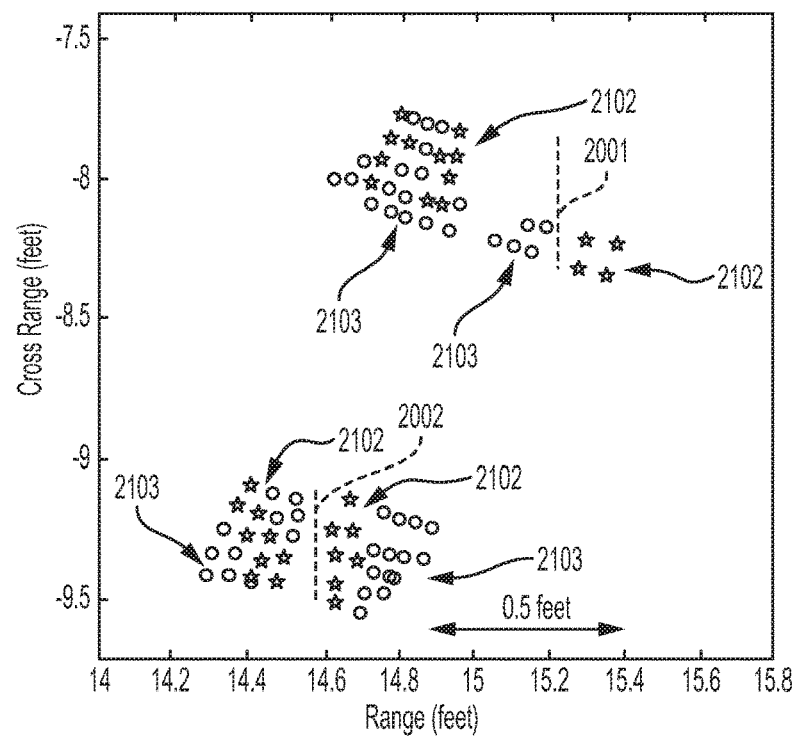
FIG. 20B is another representative graphical view of an exemplary embodiment of true target and ghost detection and imaging using the exemplary embodiment of a high-definition RF radar system.

Additional comparisons for a different target set are shown in FIGS. 20A and 20B and FIGS. 21A and 21B. FIG. 20A shows a legacy associator image having two analog targets 2001, 2002 shown as straight lines oriented vertically at range=14.3 and range=15.1. Some of the correct associations are shown as stars 2003, while some incorrect associations are shown as ghost circles 2004. All of the many ghost circles 2004 clustered around false target 2005 are incorrect associations and thus represent unwanted distortions in the image, since all of these ghosts incorrectly indicate a potential target location where one does not exist. FIG. 20B shows the same analog image of targets 2001, 2002 associated by the Boolean associator. Again correct associations are shown as stars 2102, while incorrect associations are shown as ghost circles 2103. Far fewer ghosts 2103 appear in the image of FIG. 20B as compared to ghosts 2004 of the image of FIG. 20A. The remote cluster of ghosts 2004 around false target 2005 in the legacy image (FIG. 20A) are absent in the Boolean associator image (FIG. 20B) having been eliminated by the Boolean associator.

Figure 21A:
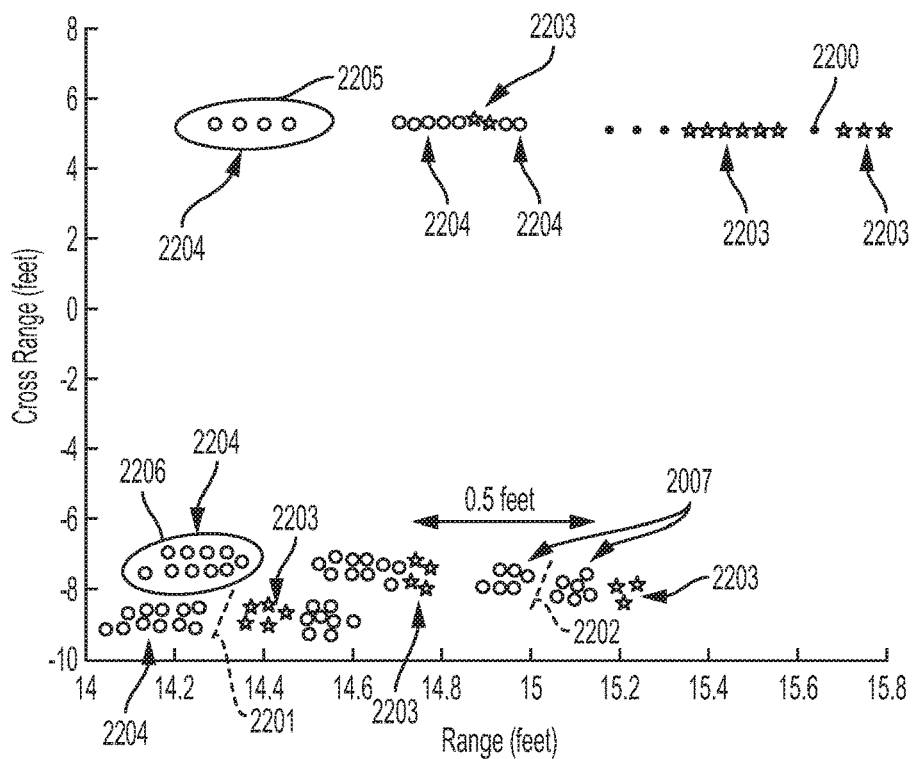
FIG. 21A is another representative graphical view of true target and ghost detection and imaging using a conventional radar system.

FIG. 21A shows a legacy associator image having one larger analog target 2200 at a distance and two smaller analog targets 2201, 2202 (shown as dashed lines) at a closer distance to the subject vehicle. As with previous comparisons, correct associations are shown as stars 2203, while incorrect associations are shown as ghost circles 2204. In FIG. 21A, stars 2203 are located at or near targets 2200, 2201, and 2202. However, many ghost circles 2204 are clustered around a first false target 2205 located farther away from the subject vehicle and a second false target 2206 located closer to the subject vehicle. Each of first false target 2205 and second false target 2206 are groups of ghosts 2204 representing incorrect associations and thus cause unwanted distortions in the image, since all of these ghosts incorrectly indicate a potential target location where one does not exist.

Figure 21B:
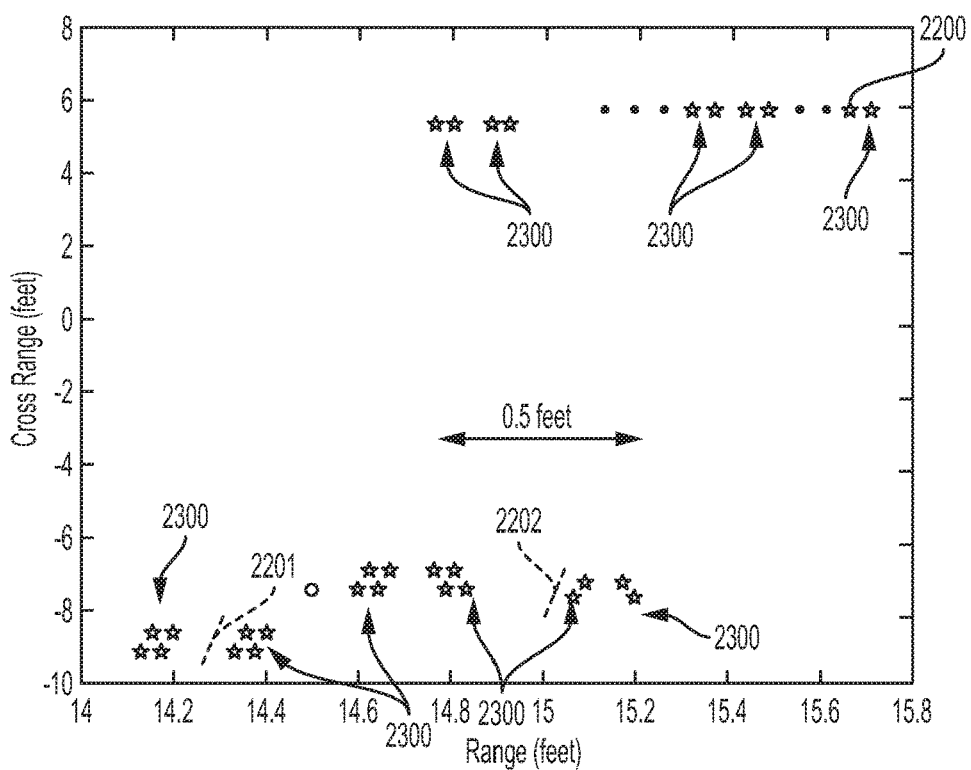
FIG. 21B is another representative graphical view of an exemplary embodiment of true target and ghost detection and imaging using the exemplary embodiment of a high-definition RF radar system.

FIG. 21B shows the same analog image of targets 2200, 2201, and 2202 associated by the Boolean associator. Again correct associations are shown as stars 2102, while incorrect associations are shown as ghost circles. Nearly no ghosts appear in the image of FIG. 21B as compared to ghosts 2204 of the image of FIG. 21A. The remote clusters of ghosts 2204 around first false target 2205 and second false target 2206 in the legacy image (FIG. 21A) are absent in the Boolean associator image (FIG. 21B) having been eliminated by the Boolean associator.

Figure 22:
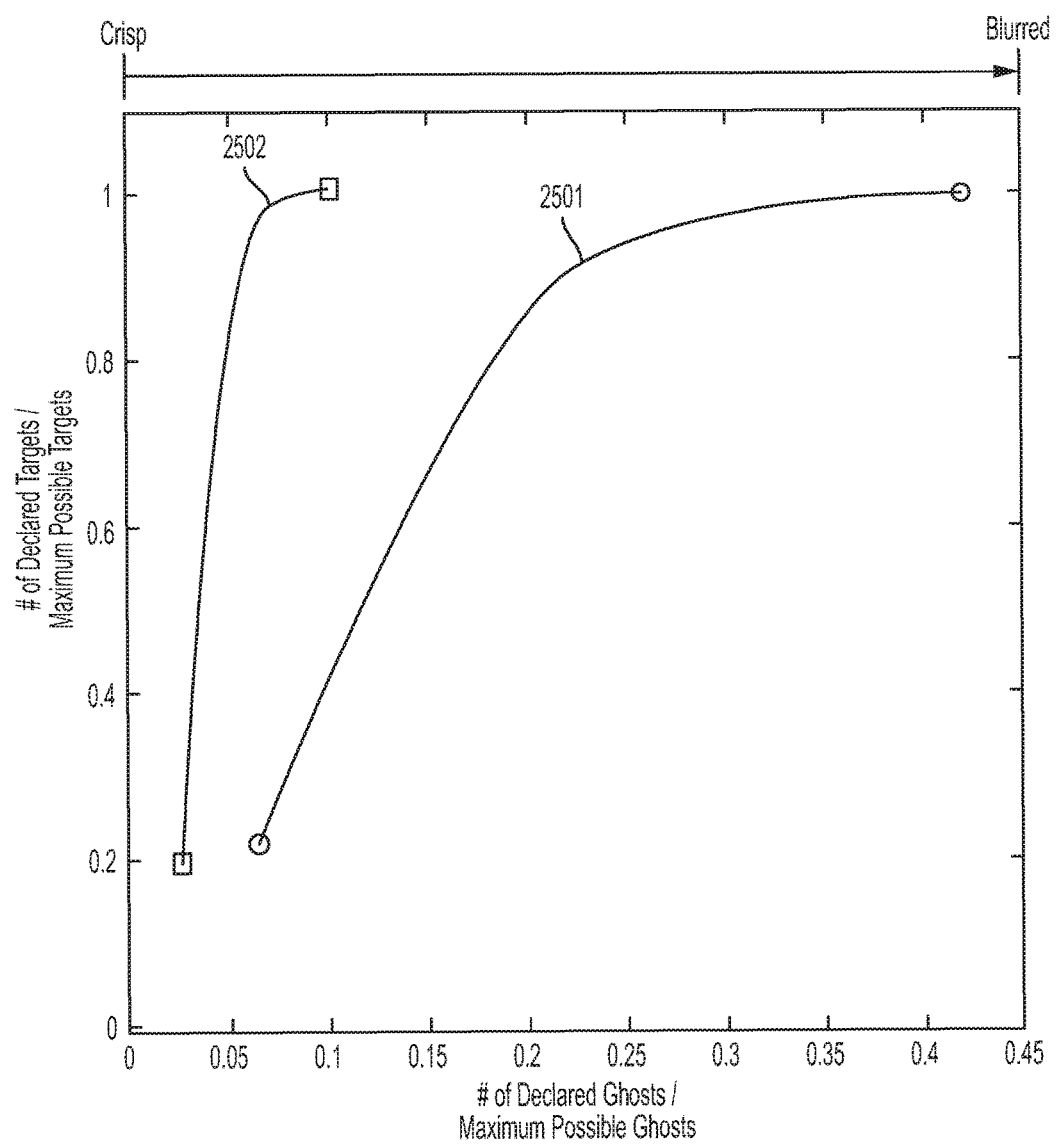
FIG. 22 is a representative graphical comparison of true target likelihood versus ghost detection likelihood of the exemplary embodiment of a high-definition RF radar system and a conventional radar system.

Referring now to FIG. 22, a comparison of the true target and ghost declaration likelihoods (in frequency counts) for both the legacy associator 2501 and Boolean associator 2502 are shown. The ordinate axis is a ratio of the number of declared targets to the maximum number of possible targets (36). The abscissa is the number of declared ghosts to the maximum number of possible ghosts (1260). As can be seen by the relative curves in FIG. 22, the Boolean associator has a greatly increased target declaration ratio with a greatly reduced ghost declaration ratio compared to the legacy associator, resulting in a much crisper image from the high definition RF radar system than the blurry image, due to high likelihood of ghosts, generated from the legacy associator.

Generally, regardless of the target true analog image, the legacy associator image quality is inferior and often leads to image misinterpretations. The image formed from true targets determined by the Boolean associator of the present embodiments has near optimal quality with reduced ghosting, limited by the sensor's resolution. The Boolean associator affords a dramatic improvement to image quality, and to subsequent feature estimators. The Boolean associated image's improved precision supports autonomous vehicle localization, navigation, and/or control.

Figure 23:
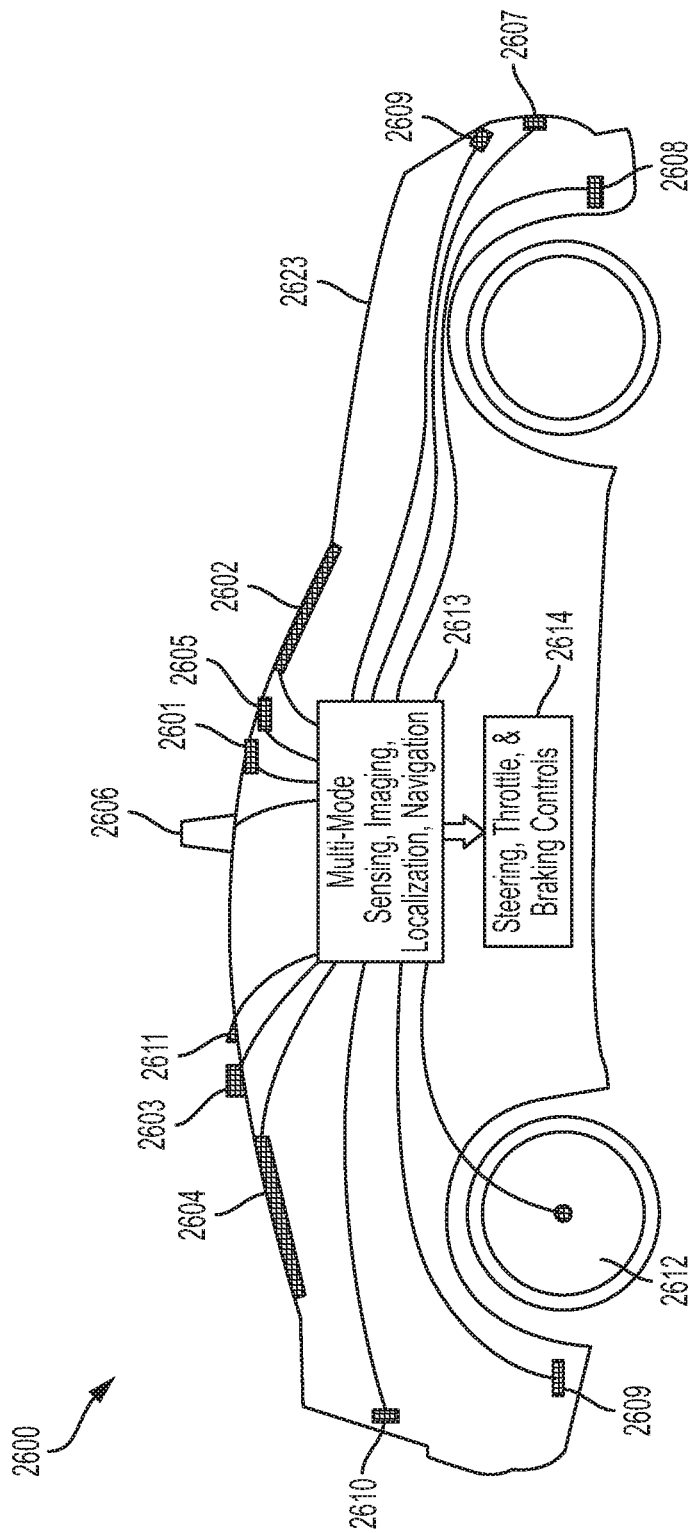
FIG. 23 is a schematic view of an alternate embodiment of an autonomous vehicle including multiple high-definition RF radar systems and other sensing systems.
Figure 24:
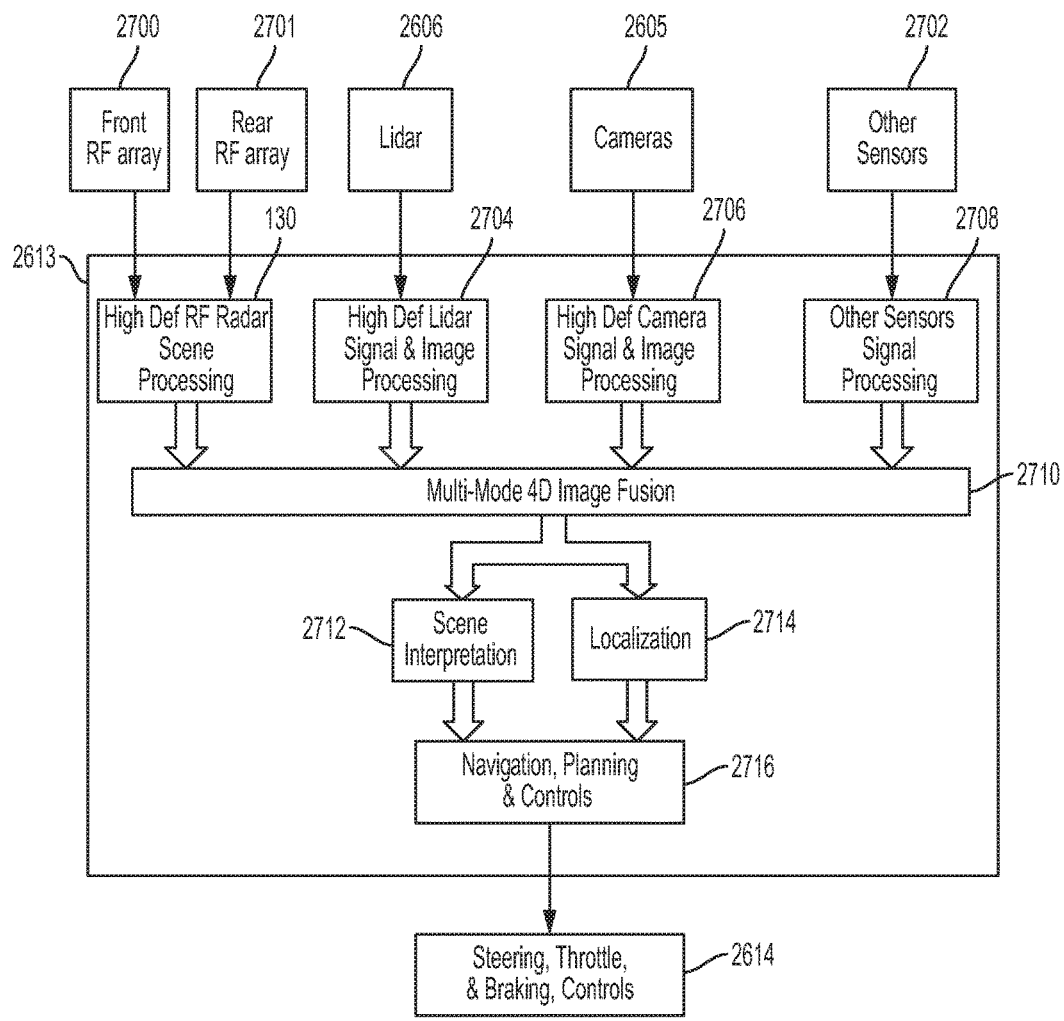
FIG. 24 is a schematic view of the alternate embodiment of an autonomous vehicle using inputs from multiple high-definition RF radar systems and other sensing systems for vehicle control.

The present embodiments of high-definition RF radar system 110, as well as the Boolean association method performed by Boolean associator 124, described herein provide an apparatus and method for deploying a distributed, sparse, and low cost high definition RF imaging sensor for autonomous vehicles. While the previous embodiments of high-definition RF radar system 110 provide sufficient resolution to support standalone navigation in almost all weather conditions for autonomous vehicles, in other embodiments, further integration with traditional sensors can increase detection capabilities of an autonomous vehicle. FIGS. 23 and 24 illustrate an exemplary embodiment of an autonomous vehicle 2600 that includes one or more high-definition RF radar systems, which may be substantially similar to high-definition RF radar system 110, described above, among a variety of other sensors to provide for improved object detection and scene imaging capabilities in many types of weather and environmental conditions.

Referring now to FIG. 23, an integrated autonomous vehicle 2600 includes a first high-definition RF radar system having generally orthogonal arrays 2601, 2602 may be located for a forward field of view, and may be substantially similar to first array 112 and second array 114 of high-definition RF radar system 110 (shown in FIG. 1). Additional high-definition RF radar systems having similar configurations may also be mounted on autonomous vehicle 2600 with generally orthogonal arrays 2603, 2604 for rear field of view and/or orthogonal arrays for side field of views (not shown). Autonomous vehicle 2600 may also be equipped with other conventionally known sensors, including, for example, cameras 2605, Lidar 2606, sonar/ultrasound 2607, 2608, 2609, 2610, GPS/INS 2611, and/or wheel encoders 2612, as well as other known sensors used for vehicle navigation and control. Together, signals from all of the sensors on autonomous vehicle 2600 may be combined by a multi-mode sensing and imaging unit 2613 for localization and navigation, and autonomous vehicle 2600 may be controlled using the output from multi-mode sensing and imaging unit 2613 by a vehicle control unit 2614.

Referring now to FIG. 24, multi-mode sensing and imaging unit 2613 receives the signals from the various sensors on autonomous vehicle 2600, including, for example, inputs from each of a front high definition RF array 2700 (i.e., orthogonal arrays 2601, 2602), a rear high definition RF array 2701 (i.e., orthogonal arrays 2603, 2604), Lidar 2606, cameras 2605, and/or other sensors 2702, which may include an optional side-facing high definition RF array, sonar/ultrasound 2607, 2608, 2609, 2610, GPS/INS 2611, and/or wheel encoders 2612, as well as other known sensors used for vehicle navigation and control.

The multi-mode sensing by multi-mode sensing and imaging unit 2613 begins with coordinating images and features from each of the uni-modal RF, optical, acoustic, motion, and other sensors inputs as shown in FIG. 24. For example, high definition RF array inputs from front high definition RF array 2700 and/or rear high definition RF array 2701 can be processed by a High Def RF radar scene processing unit 130, substantially similar to 4D scene imaging unit 130 described above. Similarly, a Lidar signal and image processing unit 2704, a camera signal and image processing unit 2706, and other sensor signal and image processing unit 2708 can each separately process images from corresponding sensors. This is followed by multi-mode image and feature fusion unit 2710 to combine all processed images from units 130, 2704, 2706, and/or 2708.

From this combined image provided by multi-mode image and feature fusion unit 2710, scene interpretation unit 2712 and localization unit 2714 can process the results to generate navigation planning of a set of time coordinated inputs to the steering, throttle, and braking control system 2614 to control autonomous vehicle 2600.

Additionally, while the present embodiments have been described in reference to radio-frequency (RF) domain imaging, it should be understood that the principles and methods described herein in relation to the exemplary embodiments can also be applied to high definition imaging systems configured for other frequency domains. For example, a high definition imaging system according to the same principles and methods for array architecture and/or Boolean association method and apparatus of the present embodiments described herein can also apply to sonar and optical arrays. Accordingly, the disclosed methods and apparatus of the present embodiments can be applied to appropriate frequencies to provide for high definition sonar imaging and/or high definition optical imaging, with the corresponding appropriate transmitters and/or receivers for such domains.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of providing scene imaging for an autonomous vehicle using a Lidar system, the method comprising:
   transmitting at least one first beam from a first array;
   receiving data at the first array received from reflections of the at least one first beam;
   transmitting at least one second beam from a second array, wherein the second array is oriented generally orthogonal to the first array;
   receiving data at the second array received from reflections of the at least one second beam;
   associating the data from the first array and the second array using a Boolean associator applying a Boolean association method to the data, wherein the Boolean association method determines the data represents a true target detection and target position of an object when a plurality of constraints are met, the plurality of constraints including at least one first type of constraint and at least one second type of constraint; and
   providing at least one of object detection information and scene imaging information to one or more systems of the autonomous vehicle from a scene imaging unit, the scene imaging unit receiving a plurality of true target detections and target positions from the Boolean associator and combining the plurality of true target detections and target positions to form the at least one of object detection information and scene imaging information.

2. The method of providing scene imaging for an autonomous vehicle using a Lidar system according to claim 1, wherein the first type of constraint is a geometric constraint and wherein the second type of constraint is a detection constraint.

3. The method of providing scene imaging for an autonomous vehicle using a Lidar system according to claim 2, wherein the detection constraint further comprises a comparison of voltages from the first array and the second array against a threshold value.

4. The method of providing scene imaging for an autonomous vehicle using a Lidar system according to claim 2, wherein the Boolean association method further comprises a first geometric constraint and a second geometric constraint; and
   wherein the Boolean associator determines the true target detection and target position when: (1) the first geometric constraint is less than or equal to a first threshold value, (2) the second geometric constraint is less than or equal to a second threshold value, and (3) the detection constraint is greater than a third threshold value.

5. The method of providing scene imaging for an autonomous vehicle using a Lidar system according to claim 4, wherein the Boolean associator determines the data represents a ghost or incorrect target detection when any of the first geometric constraint, the second geometric constraint, and/or the detection constraint are not met.

6. The method of providing scene imaging for an autonomous vehicle using a Lidar system according to claim 1, wherein the at least one first beam is an azimuthal beam and the at least one second beam is an elevational beam.

7. The method of providing scene imaging for an autonomous vehicle using a Lidar system according to claim 1, wherein at least one of the first array and the second array is an incomplete array.

8. The method of providing scene imaging for an autonomous vehicle using a Lidar system according to claim 1, wherein the first array and the second array are coherent.

9. The method of providing scene imaging for an autonomous vehicle using a Lidar system according to claim 1, wherein the autonomous vehicle provides signals for at least one of steering, acceleration, and braking controls based on the at least one of object detection information and scene imaging information provided by the scene imaging unit.

10. The method of providing scene imaging for an autonomous vehicle using a Lidar system according to claim 1, further comprising fusing multiple object information data from the scene imaging unit and at least one additional sensor, the at least one additional sensor including one or more of a camera, sonar, ultrasound, GPS, INS, wheel encoders, and a high definition RF radar system.

11. An apparatus configured to provide object detection and scene imaging for use by an autonomous vehicle, the apparatus comprising:
    at least one pair of arrays comprising sensors receiving a plurality of signals from an environment around the autonomous vehicle; and
    a Boolean associator comprising:
       a joint detection unit, the joint detection unit receiving the plurality of signals from the at least one pair of arrays and determining whether the plurality of signals represents a true target detection of an object;
       wherein the joint detection unit is configured to determine the true target detection of the object and a target position of the object when a plurality of constraints are met, the plurality of constraints including at least one first type of constraint and at least one second type of constraint;
       wherein, when both the at least one first type of constraint is met and the at least one second type of constraint is met, a true target association is declared for the received signals; and
       wherein, when at least one of the plurality of constraints is not met, a ghost association is declared for the received signals.

12. The apparatus according to claim 11, wherein the at least one pair of arrays are a pair of non-coherent arrays.

13. The apparatus according to claim 11, wherein the at least one pair of arrays are a pair of coherent arrays.

14. The apparatus according to claim 11, wherein each array of the pair of arrays is associated with at least one of an RF system, a Lidar system, a sonar system, an ultrasound system, and an optical system.

15. The apparatus according to claim 11, wherein the first type of constraint is a geometric constraint and wherein the second type of constraint is a detection constraint.

16. The apparatus according to claim 15, wherein the detection constraint further comprises a comparison of voltages from each array of the at least one pair of arrays against a threshold value.

17. The apparatus according to claim 15, further comprising a first geometric constraint and a second geometric constraint; and
    wherein the Boolean associator is configured to determine the true target detection of the object and the target position of the object when: (1) the first geometric constraint is less than or equal to a first threshold value, (2) the second geometric constraint is less than or equal to a second threshold value, and (3) the detection constraint is greater than a third threshold value.

18. The apparatus according to claim 17, wherein the Boolean associator determines the received signals represents a ghost association when any of the first geometric constraint, the second geometric constraint, and/or the detection constraint are not met.

19. The apparatus according to claim 11, wherein the Boolean associator is configured to provide a plurality of true target detections of objects and target positions of objects to a scene imaging unit, the scene imaging unit configured to combine the plurality of true target detections and target positions to form at least one of object detection information and scene imaging information for use by the autonomous vehicle.

20. The apparatus according to claim 11, wherein the at least one pair of arrays includes a first array and a second array;
    wherein the first array is associated with one of an RF system, a Lidar system, a sonar system, an ultrasound system, and an optical system; and
    wherein the second array is associated with one of an RF system, a Lidar system, a sonar system, an ultrasound system, and an optical system, the second array being associated with a different system than the first array.

* * * * *